(12) United States Patent
Ikeda et al.

(10) Patent No.: US 7,353,926 B2
(45) Date of Patent: Apr. 8, 2008

(54) ONE-WAY CLUTCH INTEGRATED WITH A ROLLING BEARING

(75) Inventors: Tetsuo Ikeda, Kashiwara (JP); Kazuo Iga, Yamatotakada (JP); Kazushi Mizutani, Barnsley (GB)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 11/474,215

(22) Filed: Jun. 23, 2006

(65) Prior Publication Data

US 2006/0266608 A1 Nov. 30, 2006

Related U.S. Application Data

(62) Division of application No. 10/828,987, filed on Apr. 21, 2004, now Pat. No. 7,093,703.

(30) Foreign Application Priority Data

| | | | |
|---|---|---|---|
| Apr. 23, 2003 | (JP) | | 2003-118922 |
| Apr. 28, 2003 | (JP) | | 2003-123111 |
| May 20, 2003 | (JP) | | 2003-142271 |
| Dec. 24, 2003 | (JP) | | 2003-426382 |

(51) Int. Cl.
*F16D 41/07* (2006.01)

(52) U.S. Cl. ............... 192/45.1; 192/41 A; 192/110 B
(58) Field of Classification Search ............. 192/41 A, 192/110 B
See application file for complete search history.

(56) References Cited

U.S. PATENT DOCUMENTS 5,135,084 A * 8/1992 Ito et al. ................ 192/38
6,109,409 A * 8/2000 Creech .................. 192/45.1

* cited by examiner

*Primary Examiner*—Richard M Lorence
(74) *Attorney, Agent, or Firm*—Jordan and Hamburg LLP

(57) ABSTRACT

A one-way clutch integrated with a rolling bearing includes rolling elements and sprags which are arranged in an annular space between an inner race and an outer race. In each of the inner and outer races, a one-way clutch raceway surface is formed in one axial side of a rolling bearing raceway surface. The rolling elements and the sprags make contact with respective raceway surfaces and are respectively housed in circumferentially spaced pockets formed in a common cage configured by mutually engaging and integrating two annular members in an axial direction. An associated peripheral side of each of the sprags contacts a surface of either a shaft fitted to an inner peripheral face of the inner race or a housing to which an outer peripheral face of the outer race is fitted.

4 Claims, 20 Drawing Sheets

ONE-WAY CLUTCH INTEGRATED WITH A ROLLING BEARING

REFERENCE TO RELATED APPLICATION

This is a divisional application of Ser. No. 10/828,987, filed Apr. 21, 2004, now U.S. Pat. No. 7,093,703. The subject matter of the aforementioned prior application is hereby incorporated herein by reference.

FIELD OF THE INVENTION

The invention relates to a one-way clutch integrated with a rolling bearing which is configured by integrating a sprag one-way clutch with a rolling bearing.

BACKGROUND OF THE INVENTION

Usually, a one-way clutch integrated with a rolling bearing has a structure in which a sprag one-way clutch is disposed on one or both axial sides of a rolling bearing such as a rolling bearing, and the inner and outer races of the rolling bearing are integrated with those of the one-way clutch, respectively.

In such a one-way clutch integrated with a rolling bearing, in order to facilitate assembling and enhance compactness, various countermeasures are taken mainly on a cage.

FIG. 14 is a partially cutaway front view of an example of a conventional one-way clutch integrated with a rolling bearing in which a sprag one-way clutch is disposed on both axial sides of a ball bearing, FIG. 15 is an axial section view of the example, and FIG. 16 is an exploded perspective view of a cage and a spring and side plate.

In this example, ball bearing raceway surfaces $61a$ and $62a$ are formed in axial center portions of an inner race 61 and an outer race 62, respectively. One-way clutch raceway surfaces $61b$ and $61c$, and $62b$ and $62c$ are formed on both sides of the ball bearing raceway surfaces. A plurality of balls 63 serving as rolling members are rollably arranged between the ball bearing raceway surfaces. A plurality of sprags 64 are arranged between the one-way clutch raceway surfaces which are on both sides of the ball bearing raceway surfaces. The balls 63 and the sprags 64 are held at predetermined intervals in the circumferential direction by a common cage 65 which is configured by engaging and integrating two annular members 651 and 652 with each other in the axial direction. Spring and side plates 66 in each of which plural spring pieces $66a$ for respectively urging the sprags 64 in a locking direction are formed on the outsides of the sprags 64 are fixed to the annular members 651 and 652 constituting the cage 65, respectively.

In the two annular members 651 and 652 constituting the cage 65, recesses $651a$ and $652a$ which, under a state where the members are engaged with each other, configure pockets for housing the balls 63 in the center portion are formed in one axial end side and at constant intervals in the circumferential direction, and pockets $651b$ and $652b$ for housing the sprags are formed in the opposite end side. In one of the two annular members 651 and 652, or the annular member 651, a claw $651c$ which elongates in the axial direction is formed in plural positions along the circumferential direction. In the other annular member 652, plural recesses $652c$ with which the claws $651c$ are to be fittingly engaged are formed.

The thus configured one-way clutch integrated with a rolling bearing is assembled in the following manner. A required number of balls 63 are inserted and arranged between the inner race 61 and the outer race 62 and at approximately constant intervals in the circumferential direction. Thereafter, the annular members 651 and 652 are inserted between the inner race 61 and the outer race 62 so as to sandwich the balls 63 from the both sides in the axial direction. The claws $651c$ are respectively inserted into the recesses $652c$ so as to be engaged therewith, whereby these members are integrated with each other. An undercut is disposed in each of the claws $651c$ and the recesses $652c$. As shown in FIG. 17 which is an enlarged axial section view showing an engagement state, an inclined face $651d$ is formed in the tip end side of each of the claws $651c$, and an engaging portion $651e$ is formed in the basal end. An engaging portion $652d$ which is to be engaged with the engaging portion $651e$ is formed in each of the recesses $652c$. Because of the engaging portions $651e$ and $652d$, in an assembling process, the annular members 651 and 652 can be easily engaged with each other by snap fit, and, after assembling, the engagement state is prevented by the engagement of the engaging portions $651e$ and $652d$ from being easily cancelled (for example, Japanese Patent Publication (Kokai) No. 2000-304068 (pages 2 to 4, and FIGS. 2, 3, and 7)).

As a structure in which a sprag one-way clutch is disposed on one side of a rolling bearing, also a configuration is known in which a cage for a rolling bearing is axially integrated with that for a sprag in the axial direction via an engagement mechanism (for example, see Japanese Patent Publication (Kokai) No. HEI11-72127 (pages 3 and 4, and FIGS. 4 to 9)).

Usually, a one-way clutch integrated with a rolling bearing which is configured by integrating a rolling bearing such as a ball bearing with a sprag one-way clutch is structured in the following manner. As exemplarily shown in an axial section view of FIG. 18, rolling bearing raceway surfaces $41a$ and $42a$ are formed on an inner race 41 and an outer race 42, respectively, and plural rolling members 43 are rollably arranged between the raceway surfaces. In the inner race 41 and the outer race 42, one-way clutch raceway surfaces $41b$ and $42b$ are formed in parallel with the rolling bearing raceway surfaces $41a$ and $42a$, respectively. A plurality of sprags 44 are arranged between the one-way clutch raceway surfaces. The rolling members 43 and the sprags 44 are arranged by a common cage 45 at constant pitches in the circumferential direction in an annular space formed between the inner race 41 and the outer race 42. Each of the sprags 44 is urged in a locking direction by urging means such as a garter spring 46.

As shown in the figure, usually, the sprag raceway surfaces $41b$ and $42b$ of the inner race 41 and the outer race 42 are usually formed as extended faces of shoulder portions $41c$ and $42c$ of the rolling bearing raceway surfaces $41a$ and $42a$, or so as to have the same diameters as those of the shoulder portions $41c$ and $42c$.

In a sprag one-way clutch, as the J space which is the distance between the raceway surfaces of inner and outer races is larger, the size of useful sprags can be made larger so that the performance including the transmission torque can be improved. In the conventional one-way clutch integrated with a rolling bearing shown in FIG. 18, the diameters of the sprag raceway surfaces of the inner and outer races are respectively equal to those of the shoulder portions of the rolling bearing raceway surfaces, and hence the size of the J space is approximately constant in accordance with the model number (size) of the rolling bearing to be integrated. Therefore, improvement of the performance of a one-way clutch is limited.

In order to widen the J space as compared with a conventional one-way clutch integrated with a rolling bearing to improve the performance including the transmission torque, the inventors proposed a one-way clutch integrated with a rolling bearing in which, as shown in an axial section view of FIG. 19, a step 510 is formed between a shoulder portion 51c adjacent to a rolling bearing raceway surface 51a and a one-way clutch raceway surface 51b, for one of an inner race 51 and an outer race 52 (in FIG. 19, the inner race 51), whereby a larger J space can be ensured (see Japanese Patent Publication (Kokai) No. 2000-291651). FIG. 19 exemplarily shows a one-way clutch integrated with a rolling bearing of the type in which rolling elements (balls) 53 of the rolling bearing, and sprags 54 of the one-way clutch are held by dedicated cages 55 and 56, and a spring member 57 wherein a plurality of spring pieces 57b are formed integrally on an annular base member 57a is used so that the sprags 54 are urged in the locking direction by the spring pieces 57b (Japanese Patent Publication (Kokai) No. 2000-291651 (pages 2 to 4, and FIG. 1).

In the proposed one-way clutch, the race in which the step is formed is determined so as to be that on the side of one of fitting counterparts S and H which has higher shape accuracy of the fitting surface, whereby accuracy of the race in which the thickness of the portion where the one-way clutch raceway surface is formed is reduced by the formation of the step can be prevented from being lowered in accordance with the counterpart as a result of the fitting.

Usually, a one-way clutch integrated with a rolling bearing which is configured by integrating a rolling bearing such as a rolling bearing with a sprag one-way clutch has the following structure. As exemplarily shown in FIG. 14 which is a partially cutaway front view, and FIG. 15 which is a section view taken along the line A-A in FIG. 14, the rolling bearing raceway surfaces 61a and 62a are formed on the inner race 61 and the outer race 62, respectively, and the rolling members 63 are rollably arranged between the rolling bearing raceway surfaces. In the inner race 61 and the outer race 62, the one-way clutch raceway surfaces 61b and 62b, and 61c and 62c are formed in parallel with the rolling bearing raceway surfaces 61a and 62a, and the sprags 64 are arranged between the one-way clutch raceway surfaces.

The rolling members 63 and the sprags 64 are held in an annular space formed between the inner race 61 and the outer race 62, at constant pitches in the circumferential direction by the cage 65 which is commonly used in this example. In this example, the cage 65 has a structure in which the two annular members 651 and 652 are integrated with each other in the axial direction, and comprises pockets for the rolling members 63 and those for the sprags 64. The rolling members 63 and the sprags 64 are housed in the pockets so as to be arranged at constant pitches in the circumferential direction. The sprags 64 are urged in the locking direction by the spring and side plates 66 in each of which plural spring pieces 66a are formed on the annular base member 66b (for example, Japanese Patent Publication (Kokai) No. 2000-304068 (pages 2 to 4)).

In such a one-way clutch integrated with a rolling bearing, lubrication is conducted by grease, and hence the space between the inner and outer races is filled with grease. In the a one-way clutch integrated with a rolling bearing disclosed in Japanese Patent Publication (Kokai) No. 2000-304068, therefore, the spring and side plates 66 which are disposed in the axis end portions exert a function of preventing grease from leaking.

Since the two annular members 651 and 652 constituting the cage 65 have the claws 651c or the recesses 652c each having an undercut, holes for enabling molds to be extracted are required. In the annular members 651 and 652, therefore, it is necessary to form axial through holes which are indicated by H in the first annular member 651 of FIG. 16 (with respect to the second annular member 652, the through holes are not shown in the figure, and are formed in positions where the recesses 652c are to communicate with the sprag pockets 652b). The spring and side plates 66 prevent the grease from leaking through the holes.

The mold extracting holes are used also as holes for filling the grease between the inner race 61 and the outer race 62. After one of the spring and side plates 66 is attached and before the other spring and side plate 66 is attached, the grease is filled via the axial through holes on the side where the spring and side plate 66 is not attached. Thereafter, the other spring and side plate 66 is attached. As a result, the workability of the assembly process including the grease filling work can be improved.

In order to reduce the production cost, the structure in which a one-way clutch is disposed on one side of a rolling bearing is more advantageous than that in which a one-way clutch is disposed on both sides of a rolling bearing. In the case where the above-described technique of Japanese Patent Publication (Kokai) No. 2000-304068 in which two annular members are axially engaged with each other by an engagement mechanism including an undercut is applied to a structure in which a one-way clutch is disposed only on one side, a spring and side plate is attached only to the one side where the one-way clutch is disposed. Therefore, grease on the other side must be sealed by additionally disposing a dedicated side plate or the like.

It is an object of the invention to provide a one-way clutch integrated with a rolling bearing which has a structure where a one-way clutch is disposed on one side of a rolling bearing, and in which a side plate or the like for preventing grease from leaking is not required on the side where the one-way clutch is not disposed, the workability of the assembling process including a grease filling work is excellent, and the grease can be satisfactorily distributed over the raceway surfaces of inner and outer races.

As a result of the proposal in Japanese Patent Publication (Kokai) No. 2000-291651, the J space can be widened as compared with a conventional one-way clutch integrated with a rolling bearing of the same kind. The race in which the step is formed can be determined so as to be that on the side of one of fitting counterparts which has higher shape accuracy of the fitting surface, so that reduction of the accuracy of the one-way clutch raceway surface due to a reduced thickness can be prevented from occurring during fitting. However, reduction of the thickness is naturally limited. This causes a bottleneck in a countermeasure in which the J space is widened to increase the size of sprags.

It is an object of the invention to provide a one-way clutch integrated with a rolling bearing in which the J space can be further widened as compared with the above-mentioned proposal, so that larger sprags can be used, and which is therefore small in size and produces a larger transmission torque.

As a result of the proposal, the J space can be widened as compared with a conventional one-way clutch integrated with a rolling bearing of the same kind, and the performance including the transmission torque can be improved. In the case where the proposed technique is applied to a portion where the space between a shaft and a housing is small and a thin rolling bearing is used, however, the J space is limitedly ensured.

In a one-way clutch integrated with a rolling bearing, sprags in a locked state transmit a torque while being locked between inner and outer races. Therefore, the fitting of the inner race to the shaft, and that of the outer race to the housing must be tight at a degree which is higher than a certain level. If not, there arises the possibility that, in a locked state, a slip occurs between the inner race and the shaft or the outer race and the housing. Consequently, a large assembly load must be applied to both the shaft and the housing, and the workability of the assembling process is not excellent.

The invention has been conducted in view of such circumstances. It is an object of the invention to provide a one-way clutch integrated with a rolling bearing in which the J space can be widened as compared not only with a conventional one-way clutch integrated with a rolling bearing but also with a one-way clutch integrated with a rolling bearing according to the proposed technique, so that, even when applied to a portion where a thin rolling bearing is used, a J space of a sufficiently large size can be ensured and a large torque transmission ability can be exerted, and the workability of a process of incorporating to a shaft or a housing can be improved.

In a rolling bearing, when an adequate gap is not formed between the raceway surfaces of inner and outer races and the outer peripheral face of each rolling member, the rolling member does not roll in a desired manner, and hence the performance cannot be exerted. Particularly, a radial gap which is a gap in a radial direction after assembly is changed from that before assembly by deformation due to incorporation to a counterpart. Therefore, radial dimensions of the raceway surfaces of the inner and outer races are measured so that the gap in production, or the so-called initial gap has a value in which a value corresponding to deformation due to fitting fixation of the inner race or the outer race to a counterpart such as a rotation shaft or a bearing box is considered. A work which is called matching, and in which the size of rolling members to be incorporated is selected in accordance with the dimensions is conducted. Thereafter, the assembling process is conducted.

By contrast, a sprag one-way clutch cannot exert the ability unless the J space which is the radial dimension between the raceway surfaces of the inner and outer races for the one-way clutch is adequately held and the radial gap with respect to a sprag is optimumly held.

In a one-way clutch integrated with a rolling bearing in which a rolling bearing is integrated with a one-way clutch, the inner race and the outer race are often incorporated into respective counterparts by an interference fit. Therefore, the inner race is deformed in a direction along which the diameter expands, and the outer race is deformed in a direction along which the diameter contracts, whereby, in a state where they are incorporated into respective counterparts, the J space is correspondingly narrowed. The reduction degree of the J space is varied depending on the fitting to the counterpart and the dimensional accuracy of the counterpart.

In order to optimumly hold the J space after assembly, a conventional one-way clutch integrated with a rolling bearing is processed in the following manner. As shown in axial section views of FIGS. 20A and 20B respectively showing only the inner race 61 and the outer race 62, the diameters $ICD_i$ and $OCD_i$ of the one-way clutch raceway surfaces 61b and 62b of the inner race 61 and the outer race 62 are independently controlled irrespective of the diameters IBD and OBD of the rolling bearing raceway surfaces, and processed into plural dimensions $ICD_i$ (i=1, 2, 3, . . . ) and $OCD_i$ (i=1, 2, 3, . . . ) in accordance with the kinds of the counterparts to which the rolling bearing is to be incorporated, so that an initial J space corresponding to the kinds of the counterparts is obtained.

This causes the number of steps of inspecting and controlling the dimensions during a production process, and increases the production cost.

The invention has been conducted in view of such circumstances. It is an object of the invention to provide a method of producing a one-way clutch integrated with a rolling bearing in which the number of steps of inspection and control during a production process can be reduced as compared with a conventional art and hence the production cost can be lowered.

SUMMARY OF THE INVENTION

In order to attain the objects, the one-way clutch integrated with a rolling bearing of the invention is a one-way clutch integrated with a rolling bearing in which plural rolling elements and sprags are arranged in an annular space between an inner race and an outer race in each of which a one-way clutch raceway surface is formed in one axial side of a rolling bearing raceway surface, the rolling elements and the sprags make contact with respective raceway surfaces and are respectively housed in pockets formed in a common cage, to be held at predetermined intervals in a circumferential direction, the cage being configured by engaging and integrating two annular members with each other in an axial direction, and the one-way clutch comprises urging means for urging the sprags in a locking direction in the pockets, wherein an annular flat plate portion which seals one axial end portion of the annular space between the inner race and the outer race is integrally formed in one of the two annular members constituting the cage, at least one radial through hole which passes in a radial direction is formed in the one annular member, and at least one axial through hole which passes in the axial direction is formed in another one of the annular members.

In the invention, a configuration may be preferably employed in which the urging means has a structure in which plural spring pieces that respectively urge the sprags are integrally formed in an annular flat plate member, and the urging means is attached to an axial outer side of the other annular member to cover the axial through hole, thereby sealing another axial end portion of the annular space.

In the invention, a configuration may be preferably employed in which each of the annular members constituting the cage is formed by an injection molded resin, and the axial through hole and the radial through hole which are formed in the annular members are mold extracting holes for forming an undercut disposed in an engagement portion between the annular members.

According to the invention, a one-way clutch integrated with a rolling bearing having a structure in which a one-way clutch is disposed on only one side of a rolling bearing is provided with an excellent assembly workability based on the above-described technique of Japanese Patent Publication (Kokai) No. 2000-304068, and with functions of eliminating the necessity of a side plate for sealing grease on the one side, and allowing the grease between the inner and outer races to have an excellent flowability.

In one configuration, the annular flat plate portion which seals one axial end side of the annular space between the inner and outer races is integrally formed in one of the two annular members constituting the cage, so that a side plate for sealing grease is not required on the side of the annular member. The axial through hole which passes in the axial direction is formed in the other annular member, and hence grease can be poured after an assembling process. Since the radial through hole which passes in a radial direction is formed in the annular member in which the annular flat plate portion is integrally formed, the grease poured into the space between the inner and outer races can easily flow.

According to a further aspect, a structure in which plural spring pieces are integrally formed in an annular flat plate member is used as means for urging the sprags, and the structure is placed on the side of the annular member in which the axial through hole is formed, thereby sealing the through hole. According to the configuration, the side plate for sealing grease can be used also as the urging means, and hence it is possible to attain an effect that the number of parts can be reduced.

In accordance with a further aspect, when the two annular members constituting the cage are made of an injection molded resin, the axial through hole and the radial through hole can be used as mold extracting holes for forming an undercut in an engagement mechanism.

In order to attain the objects, the one-way clutch integrated with a rolling bearing of the invention is a one-way clutch integrated with a rolling bearing in which plural rolling elements for a rolling bearing, and sprags for a one-way clutch are arranged in an annular space between an inner race and an outer race in each of which a one-way clutch raceway surface is formed on an axial side of a rolling bearing raceway surface, with corresponding to the raceway surfaces, wherein, in each of the inner race and the outer race, a step is formed between the one-way clutch raceway surface and a shoulder portion adjacent to the rolling bearing raceway surface, the step being directed in a direction in which a radial dimension of the annular space in the one-way clutch raceway surface is larger than a radial dimension of the annular space in the shoulder portion.

In the invention, a configuration may be preferably employed in which an inner peripheral face of the inner race and an outer peripheral face of the outer race are fitted to respective counterparts, a radial thickness of a one-way clutch raceway surface forming portion of one of the inner race and the outer race is smaller than a radial thickness of a one-way clutch raceway surface forming portion of another one of the inner race and the outer race, the one of the inner race and the outer race being fitted to one of the counterparts which has higher shape accuracy of a fitting surface with respect to the inner race or the outer race.

According to the invention, a step in the direction of widening the J space is disposed in both the inner race and the outer race, whereby the J space can be further widened as compared with the case where a step is disposed in one of the races. In the one-way clutch raceway surface forming portions of the inner and outer races, moreover, the size of the step formed in the race on the side where the fitting portion of the fitting counterpart has higher shape accuracy is set to be larger, whereby the effect due to the reduced thickness caused by the disposition of the step is lessened as far as possible.

In accordance with a further aspect, a step in the direction of widening the J space is disposed in both the inner race and the outer race, whereby the room for widening the J space is increased and the degree of freedom in design is improved as compared with the case where a step is disposed in one of the races.

The steps of the inner and outer races are set so that the thickness of the one-way clutch raceway surface forming portion of one of the races where the shape accuracy of the fitting surface of the counterpart is superior is smaller than that of the portion of another one of the races, whereby degradation of the shape accuracy of the one-way clutch raceway surface which is caused by the thickness reduction as a result of deformation following to the counterpart in fitting to the counterpart can be prevented from occurring.

In order to solve the problems, the one-way clutch integrated with a rolling bearing according to another embodiment of the invention is a one-way clutch integrated with a rolling bearing in which a sprag one-way clutch is integrally formed on a side of a rolling bearing, wherein a one-way clutch raceway surface with which outer peripheral sides of sprags of the one-way clutch make contact is integrally formed on an axial side of a raceway surface of an outer race of the rolling bearing, and inner peripheral sides of the sprags are to make contact with an outer peripheral face of a shaft which is to be fitted to an inner peripheral face of an inner race of the rolling bearing, thereby conducting torque transmission between the outer peripheral face of the shaft and the one-way clutch raceway surface of an inner periphery of the outer race.

In order to solve the same problems, the one-way clutch integrated with a rolling bearing according to another embodiment of the invention is a one-way clutch integrated with a rolling bearing in which a sprag one-way clutch is integrally formed on a side of a rolling bearing in the same manner as described above, wherein a one-way clutch raceway surface with which inner peripheral sides of sprags of the one-way clutch make contact is integrally formed on an axial side of a raceway surface of an inner race of the rolling bearing, and outer peripheral sides of the sprags are to make contact with an inner peripheral face of a housing to which an outer peripheral face of an outer race of the rolling bearing is to be fitted, thereby conducting torque transmission between the inner peripheral face of the housing and the one-way clutch raceway surface of the inner race.

A configuration may be preferably employed in which an outer diameter of a portion of the shaft with which the inner peripheral sides of the sprags are to make contact is approximately equal to an outer diameter of a portion to which the inner peripheral face of the inner race of the rolling bearing is to be fitted. A configuration may be preferably employed in which an inner diameter of a portion of the housing with which the outer peripheral sides of the sprags are to make contact is approximately equal to an inner diameter of a portion to which the outer peripheral face of the outer race of the rolling bearing is to be fitted. In the invention, the configuration in which the outer diameters of two portions of a shaft or the inner diameters of two portions of a housing are "approximately equal to each other" means that a step or the like is not intentionally disposed and a uniform outer or inner diameter is formed.

In the invention, "outer peripheral face of a shaft" includes not only the outer peripheral face of the shaft body but also that of another member which is fixed to the shaft body to substantially constitute a single shaft member, and "inner peripheral face of a housing" includes not only the inner peripheral face of the housing body but also that of another member which is fixed to the housing body to substantially constitute a single housing member.

According to the invention, the outer peripheral face of the shaft or the inner peripheral face of the housing is used as one of the inner and outer one-way clutch raceway surfaces, thereby attaining the objects.

According to a further aspect of the invention, the one-way clutch raceway surface with which the outer peripheral sides of the sprags of the one-way clutch make contact is integrally formed on the outer race of the rolling bearing in the same manner as a conventional one-way clutch, but only the rolling bearing raceway surface is formed on the inner race so that the inner race is used substantially only for the rolling bearing. The inner peripheral sides of the sprags are not in contact with the inner race but are in direct contact with the outer peripheral face of the shaft. According to the configuration, the J space can be widened by a dimension corresponding to the thickness of the inner race as compared with a conventional case where a one-way clutch raceway surface is formed on the outer peripheral face of an inner race.

In another aspect of the invention, the one-way clutch raceway surface is integrally formed on the inner race of the rolling bearing in the same manner as a conventional one-way clutch, but only the rolling bearing raceway surface is formed on the outer race so that the outer race is used substantially only for the rolling bearing. The outer peripheral sides of the sprags are not in contact with the outer race but are in direct contact with the inner peripheral face of the housing. According to the configuration, in the same manner as described above, the J space can be widened by a dimension corresponding to the thickness of the outer race as compared with a conventional case.

The outer diameter of the shaft portion with which the inner peripheral sides of the sprags are to make contact, and the inner diameter of the housing portion with which the outer peripheral sides of the sprags are to make contact are not particularly restricted. In order to solve the above-discussed problems and employ a structure in which a conventional one-way clutch integrated with a rolling bearing is simply incorporated without providing the shaft or the housing with a special structure, i.e., a special structure due to the application of the invention, it is preferable to, set the outer diameter of a portion of the shaft with which the inner peripheral sides of the sprags make contact to be approximately equal to the outer diameter of a portion which is fitted to the inner peripheral face of the inner race, or set the inner diameter of a portion of the housing with which the outer peripheral sides of the sprags make contact to be approximately equal to the inner diameter of a portion to which the outer peripheral face of the outer race is fitted. According to the configuration, the above-discussed problems can be solved, and the production cost of the shaft or the housing can be prevented from rising, without affecting the other performances required in the shaft or the housing.

In order to attain the objects, the method of producing a one-way clutch integrated with a rolling bearing of the invention is a method of producing a one-way clutch integrated with a rolling bearing in which plural rolling elements and sprags are arranged in an annular space between an inner race and an outer race in each of which a one-way clutch raceway surface is formed axially adjacent to a rolling bearing raceway surface, wherein the inner race and the outer race are processed so that a radial dimension difference between the rolling bearing raceway surface and the one-way clutch raceway surface is within a predetermined tolerance with respect to dimensions that are set respectively for the raceway surfaces, and the inner race and the outer race are matched and incorporated so as to obtain an initial radial gap at which, in a state where the inner race and the outer race are fitted to respective counterparts, a radial gap of the rolling bearing has a preset value (claim 10).

In the invention, a method (claim 11) may be preferably employed in which, in the inner race and the outer race, the rolling bearing raceway surface and the one-way clutch raceway surface are simultaneously ground by a form grinding process using a rotary dresser. In the invention, the dimensions of the one-way clutch raceway surfaces of the inner and outer races are not controlled, but, while using the phenomenon in which, when the inner race and the outer race are incorporated into respective counterparts, the degree of a dimensional change of the J space due to the dimensions of the counterparts approximately coincides with the degree of a change of the gap of the rolling bearing, both the inner and outer races are processed so that the difference between the radial dimensions of the rolling bearing raceway surface and the one-way clutch raceway surface has the preset value, thereby attaining the objects.

In the invention, as indicated by an inner race 1 shown in FIG. 13A which is a view showing a fourth embodiment, and an outer race 2 shown in FIG. 13B, each of the inner race 1 and the outer race 2 is processed so that the difference between the diameter IBD or OBD of a rolling bearing raceway surface 1a or 2a and the diameter ICD or OCD of a one-way clutch raceway surface 1b or 2b has a value which is predetermined for each of the races, specifically, so that the step which is indicated by $\delta$ ($=(ICD-IBD)/2$) or $\Delta$ ($=(OBD-OCD)/2$) in the figure has a value that is predetermined for each of the races. As result of the process, the dimensions IBD and OBD of the rolling bearing raceway surfaces 1a and 2a are matched in accordance with the ball diameter Bd so as to obtain an adequate initial radial gap which enables a desired radial gap to be obtained after the inner race 1 and the outer race 2 are incorporated into the respective counterparts. According to the configuration, an adequate initial J space which enables a desired J space to be obtained after incorporation.

According to the method, when the diameter of balls serving as the rolling elements is indicated by Bd and the radial gap between the rolling bearing raceway surface and the ball rolling surface is indicated by Tr, the J space after the inner race 1 and the outer race 2 are incorporated into the counterparts is given by:

$$J\ \text{space} = Bd + Tr/2 - (\delta + \Delta) \tag{1}$$

Namely, the J space is constant, and it is not required to change the dimension of the one-way clutch raceway surface depending on the counterpart.

In order to easily realize a process in which the step differences $\delta$ and $\Delta$ between the rolling bearing raceway surfaces 1a and 2a of the inner race and the outer race, and the one-way clutch raceway surfaces 1b and 2b are constant, it is preferable to employ a form grinding process using a rotary dresser. When such a form grinding process is employed, the shape of the rotary dresser is transferred to a workpiece via a grinding wheel, and hence the steps $\delta$ and $\Delta$ are always constant irrespective of cutting by the grinding wheel.

DESCRIPTION OF THE PREFERRED EMBODIMENTS

Figure 1:
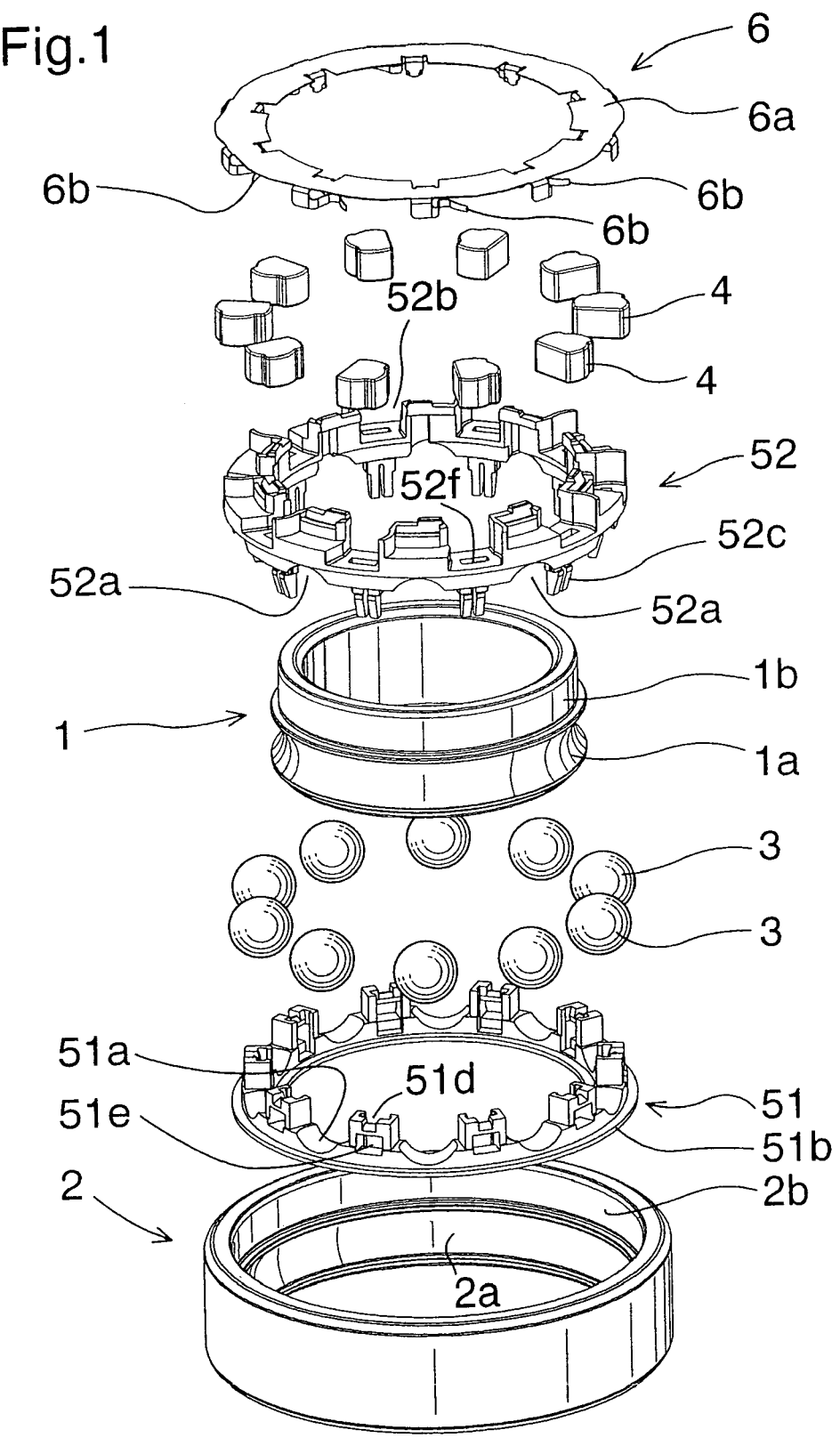
FIG. 1 is an exploded perspective view of a first embodiment of the invention.
Figure 2:
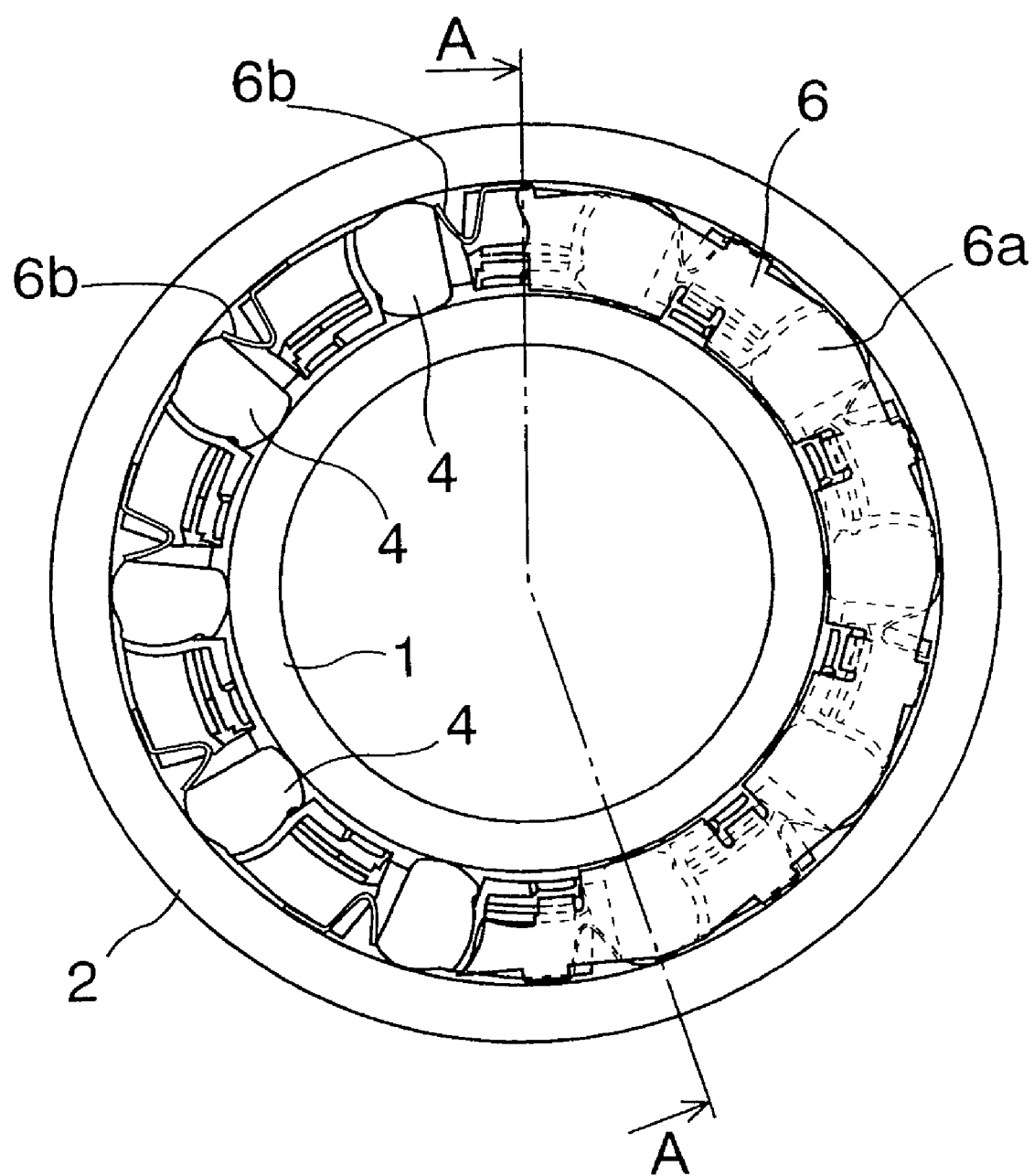
FIG. 2 is a side view of the first embodiment of the invention, partially cutting away a side plate.
Figure 3:
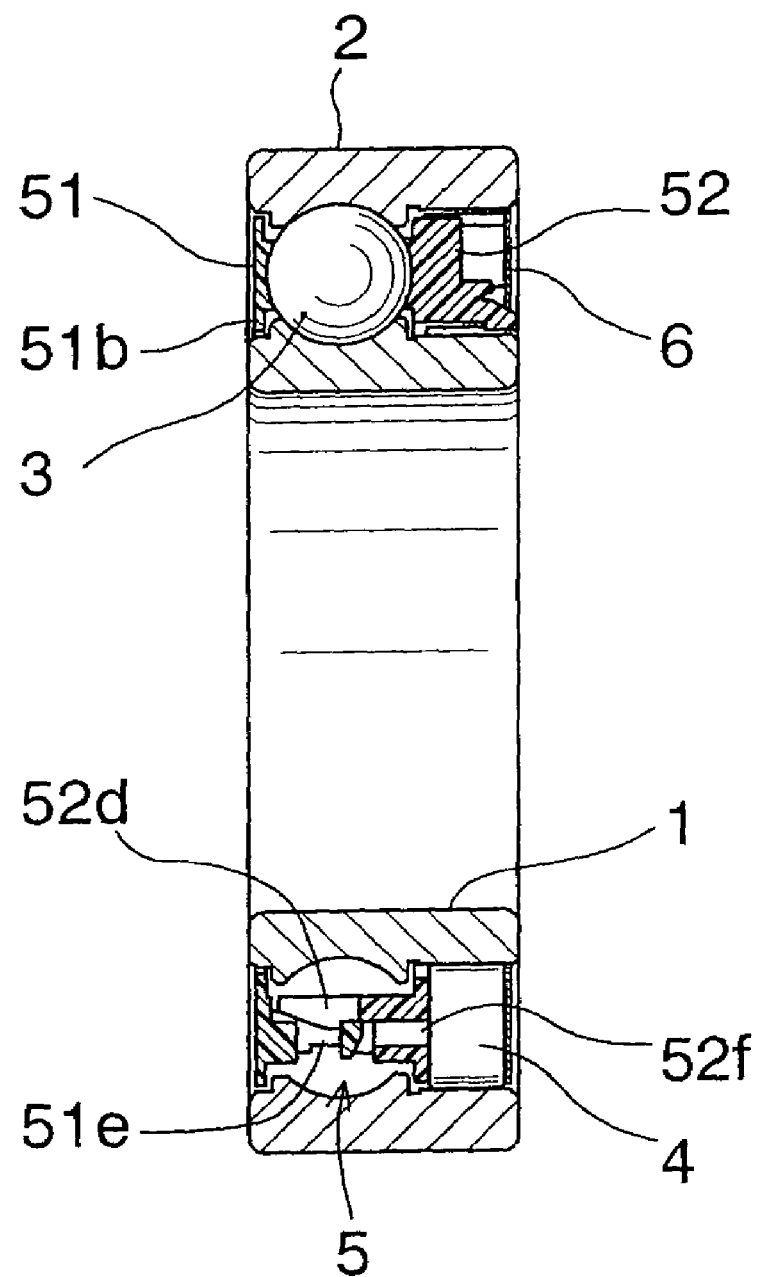
FIG. 3 is a section view taken along the line A-A of FIG. 2.

Hereinafter, a first embodiment of the invention will be described with reference to the accompanying drawings. FIG. 1 is an exploded perspective view of the embodiment of the invention, FIG. 2 is a side view, partially cutting away a side plate, and FIG. 3 is a section view taken along the line A-A of FIG. 2.

A raceway surface 1a for a deep groove ball bearing, and a raceway surface 1b for a one-way clutch are formed axially adjacent to each other in the outer peripheral face of an inner race 1. Opposing to the raceway surfaces, a raceway surface 2a for a deep groove ball bearing, and a raceway surface 2b for a one-way clutch are formed on the inner peripheral face of an outer race 2. Plural balls 3 serving as rolling elements are arranged between the inner race 1 and the outer race 2 so as to make rolling contact with both the raceway surfaces 1a and 2a for a deep groove ball bearing, and plural sprags 4 are arranged so as to tiltably make contact with the raceway surfaces 1b and 2b for a one-way clutch.

A cage 5 which holds the balls 3 and the sprags 4 at predetermined pitches in the circumferential direction is placed between the inner race 1 and the outer race 2. The cage 5 is configured by engaging and integrating first and second annular members 51 and 52 with each other in the axial direction. Recesses 51a and 52a the numbers of which are equal to each other are formed in opposed positions of the annular members 51 and 52. In the engagement state, ball pockets are formed by the recesses 51a and 52a. An annular flat plate portion 51b is formed on the side of the face which is opposite to the face of the first annular member 51a in which the recesses 51a are formed. The inner and outer peripheries of the flat plate portion 51b are opposed to the outer peripheral face of the inner race 1, and the inner peripheral face of the outer race 2 via small gaps, respectively. One axial end side of the annular space between the inner race 1 and the outer race 2 is sealed by the flat plate portion 51b. Plural sprag pockets 52b for respectively housing the sprags 4 are formed in the side of the second annular member 52 which is opposite to the recesses 52a.

On the side of the other axial end of the annular space between the inner race 1 and the outer race 2, i.e., the end on the side where the sprags 4 are arranged, a spring and side plate 6 in which plural spring pieces 6b for urging the sprags 4 in a locking direction are integrally formed is fixed to the second annular member 52.

Figure 4A:
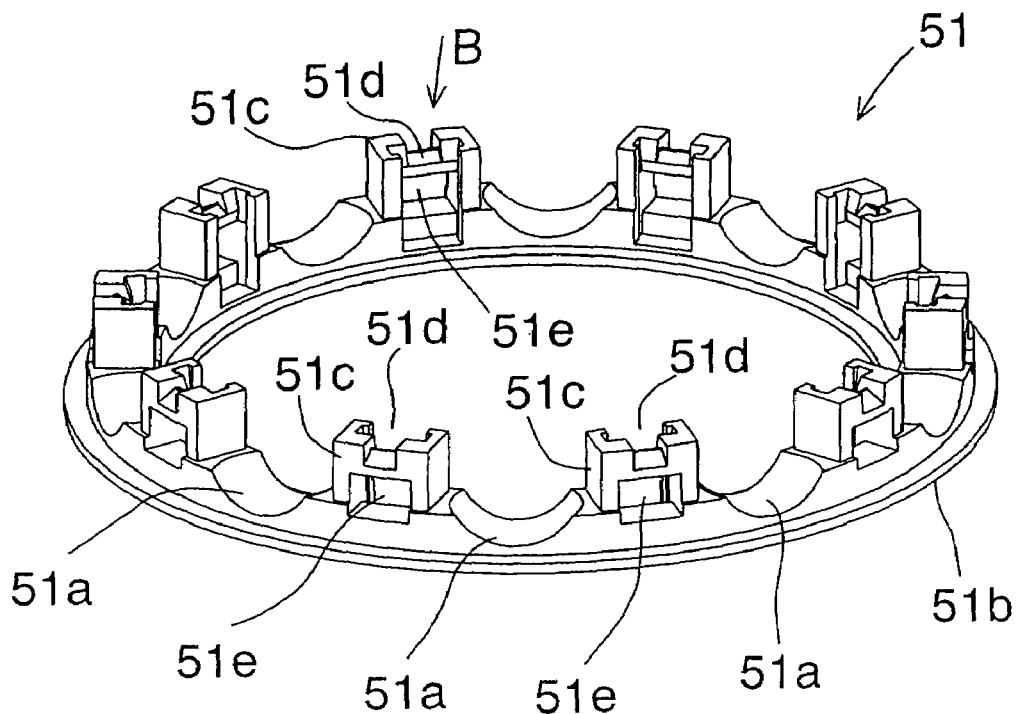
FIG. 4A is a perspective view illustrating a first annular member 51 constituting a cage 5 in the first embodiment of the invention.
Figure 4B:
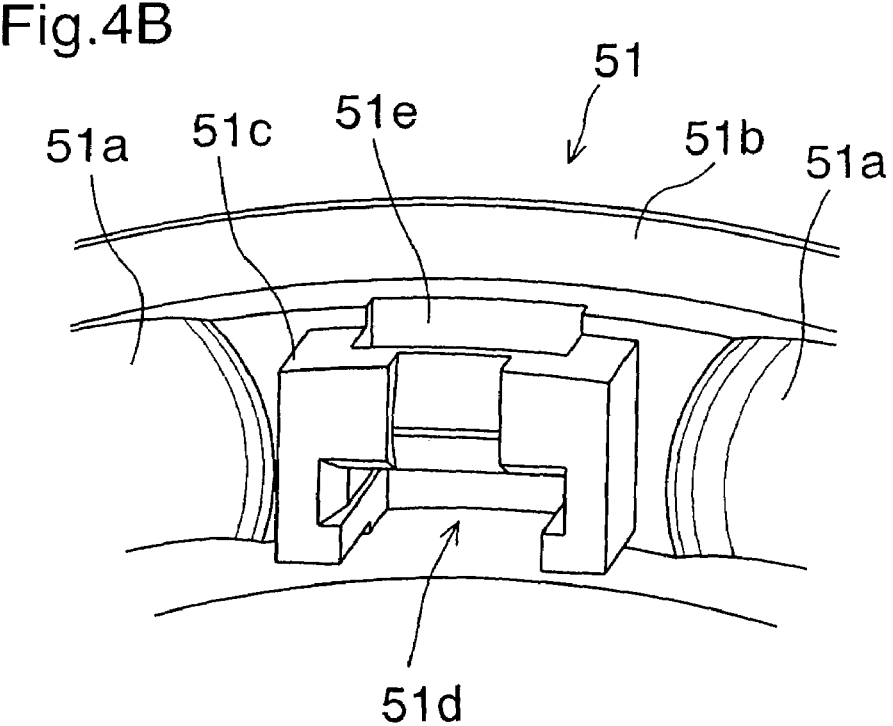
FIG. 4B is an enlarged view looking in the direction of the arrow B.
Figure 5A:
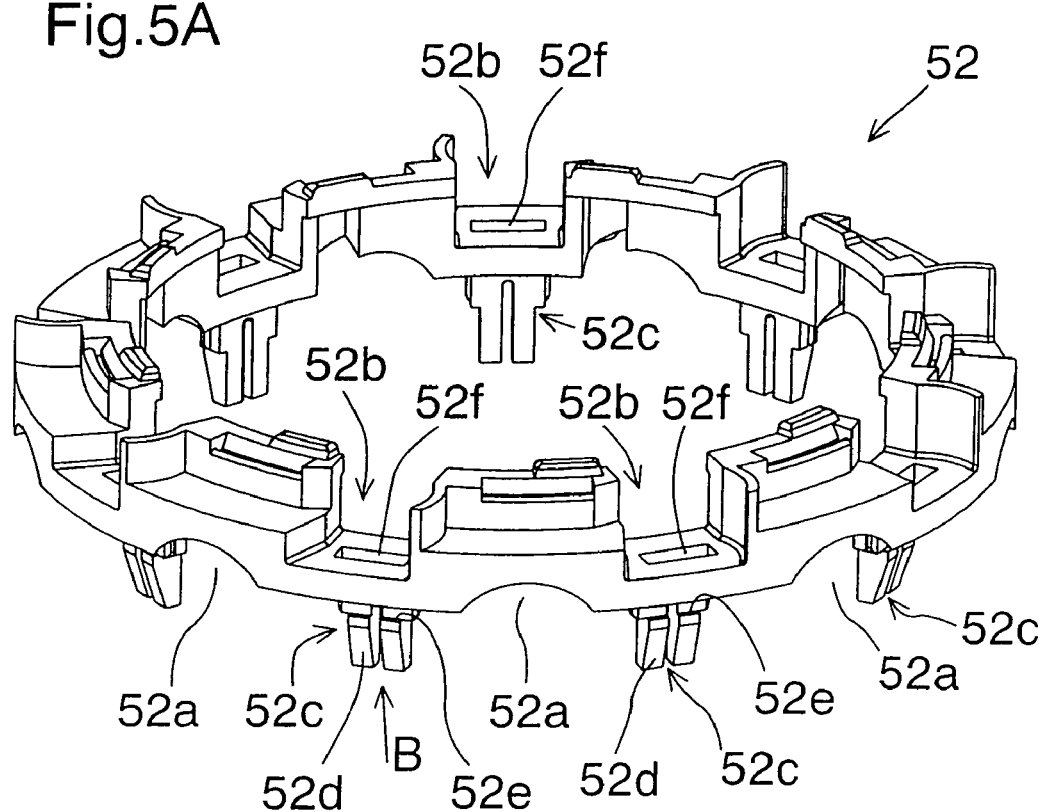
FIG. 5A is a perspective view illustrating a second annular member 52 constituting the cage 5 in the first embodiment of the invention.
Figure 5B:
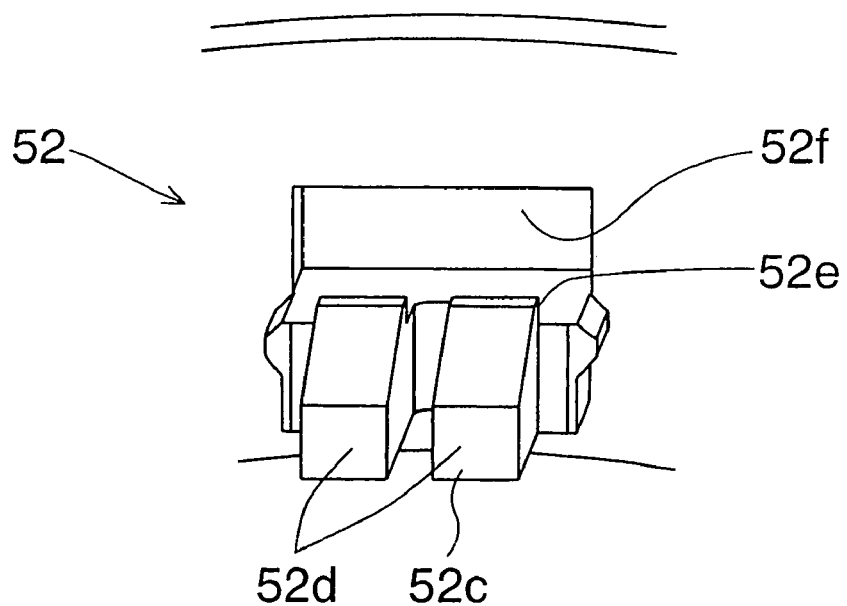
FIG. 5B is an enlarged view looking in the direction of the arrow B.

FIG. 4A is a perspective view illustrating the first annular member 51 constituting the cage 5, and FIG. 4B is an enlarged view looking in the direction of the arrow B. FIG. 5A is a perspective view illustrating the second annular member 52, and FIG. 5B is an enlarged view looking in the direction of the arrow B.

In the first annular member 51, engagement portions 51c which axially protrude are respectively formed between the recesses 51a for ball pockets, and a guide groove 51d which axially elongates is formed in each of the engagement portions 51c. A radial through hole 51e which passes in a radial direction of the first annular member 51 is formed in the inner side of the guide groove 51d (the basal end side of the engagement portion 51c). The inner side of the guide groove 51d communicates with the radial through hole 51e.

By contrast, in the second annular member 52, claws 52c which protrude in the axial direction are respectively formed between the ball pocket recesses 52a. In each of the claws 52c, an inclined face 52d is formed in the tip end, and an engaging portion 52e is formed in the basal end of the inclined face 52d. An axial through hole 52f which axially passes is formed in the root portion of the claw 52c.

The two annular members 51 and 52 are integrated with each other in the following manner. In a state where the guide grooves 51d and the claws 52c are opposed to one another and their centers are substantially coincident with one another, the claws 52c are inserted into the guide grooves 51d, respectively. When the engaging portions 52e of the claws 52c then reach the respective radial through holes 51e communicating with the inner sides of the guide grooves 51d, the annular members are surely engaged and integrated with each other in such a manner that they are unseparable in a usual use state.

The thus configured first and second annular members 51 and 52 are produced by injection molding of a resin. In the first annular member 51, the radial through holes 51e communicating with the inner sides of the guide grooves 51d are formed as undercuts, and, in the second annular member 52, the engaging portions 52e formed in the basal portions of the claws 52c are formed as undercuts. When a split mold which radially moves is used, the radial through holes 51e can be molded with using the radial through holes 51e themselves as extracting holes for the split mold, and the engaging portions 52e can be molded with using the axial through holes 52f as mold extracting holes.

The embodiment of the invention can be assembled in the following manner. In a state where the outer race 2 is placed on the outside of the inner race 1, a required number of balls 3 are arranged between the rolling bearing raceway surfaces 1a and 2a at substantially constant intervals in the circumferential direction. Under this state, the first and second annular members 51 and 52 are inserted between the inner race 1 and the outer race 2 from the both axial sides so as to sandwich the balls 3, and the claws 52c are respectively inserted into the guide grooves 51d to be engaged and integrated with each other. In this state, the annular space between the inner race 1 and the outer race 2 is sealed in the end portion on the side of the first annular member 51 by the flat plate portion 51b of the first annular member 51, and, in the opposite side, the axial through holes 52f formed in the second annular member 52 are opened. When grease is then poured via the axial through holes 52f in this state, the space between the rolling bearing raceway surfaces 1a and 2a can be easily filled with the grease. Thereafter, the sprags 4 are inserted into the sprag pockets 52b formed in the second annular member 52, respectively, and the spring and side plate 6 is attached. In this sate, the spring and side plate 6 covers the axial through holes 52f to seal the end portion of the annular space between the inner race 1 and the outer race 2 on the side of the second annular member 52. Therefore, the grease does not leak.

In the use state, the existence of the radial through holes 51e formed in the first annular member 51 allows the grease to freely flow between the inner race 1 and the outer race 2, and the life can be expected to be prolonged by the improved lubrication performance.

In the above, the embodiment in which a ball bearing is used as the rolling bearing has been described. Alternatively, a rolling bearing of another kind such as a roller bearing may be used.

As described above, according to the invention, in a one-way clutch integrated with a rolling bearing in which a one-way clutch is placed on one side of rolling bearing, a cage for holding rolling elements and sprags is structured by engaging two annular members with each other, a flat plate portion which seals the annular space between inner and outer races is disposed on one of the annular members, a radial through hole which passes in a radial direction is formed in the one annular member, and an axial through hole which passes in the axial direction is formed in the other annular member. Therefore, the workability of the assembling process including the grease filling work can be improved, and, also during use, the grease has an excellent flowability and the lubrication performance is improved. This contributes to the prolonged life.

The axial through hole and the radial through hole can be used in mold extraction for forming undercuts which are disposed in engaging portions of each of the annular members. Therefore, a cage which is hardly split even by an application of an impact load or the like can be obtained.

A second embodiment of the invention will be described with reference to the accompanying drawings.

Figure 6:
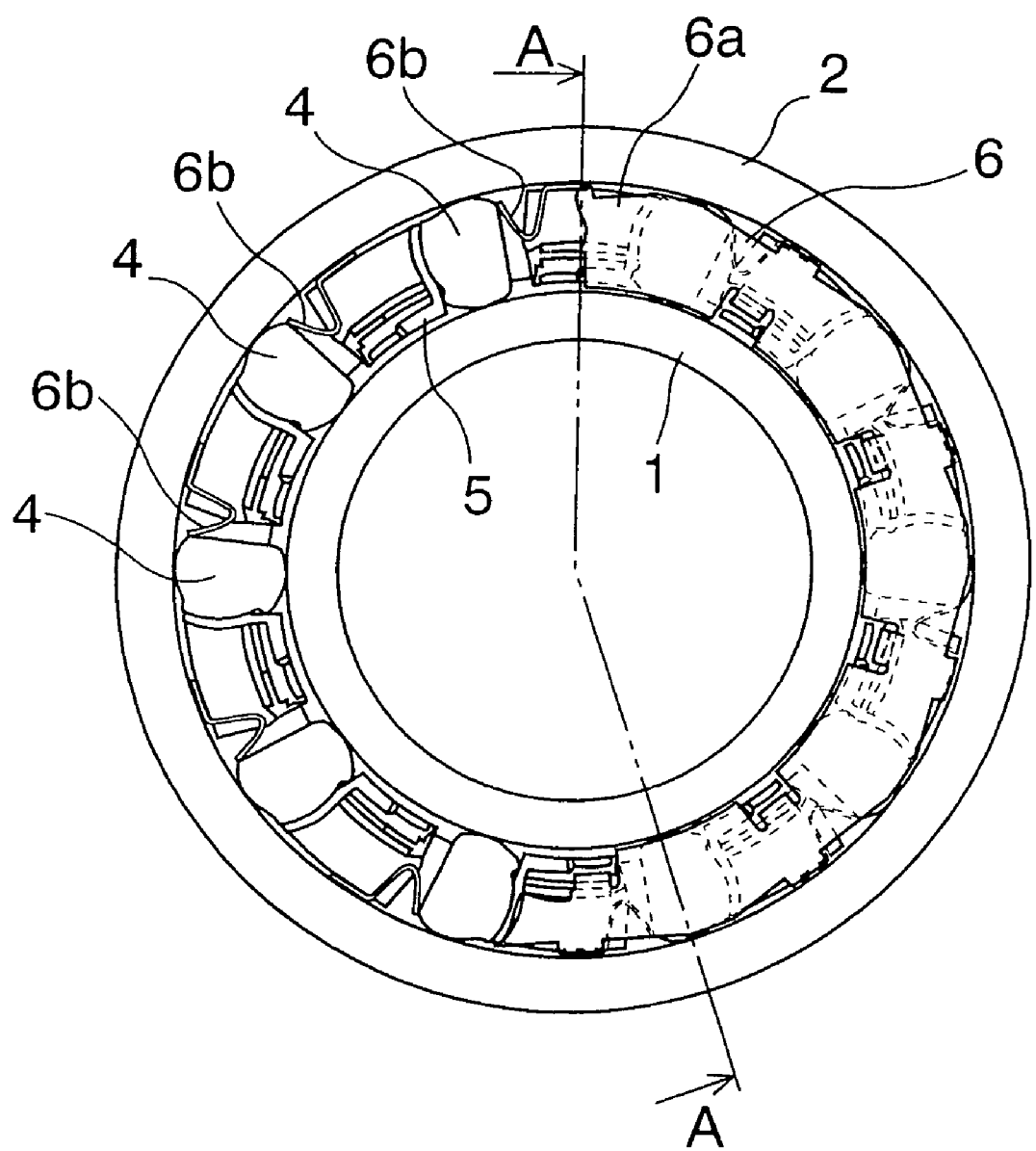
FIG. 6 is a partially cutaway front view of a second embodiment of the invention.
Figure 7:
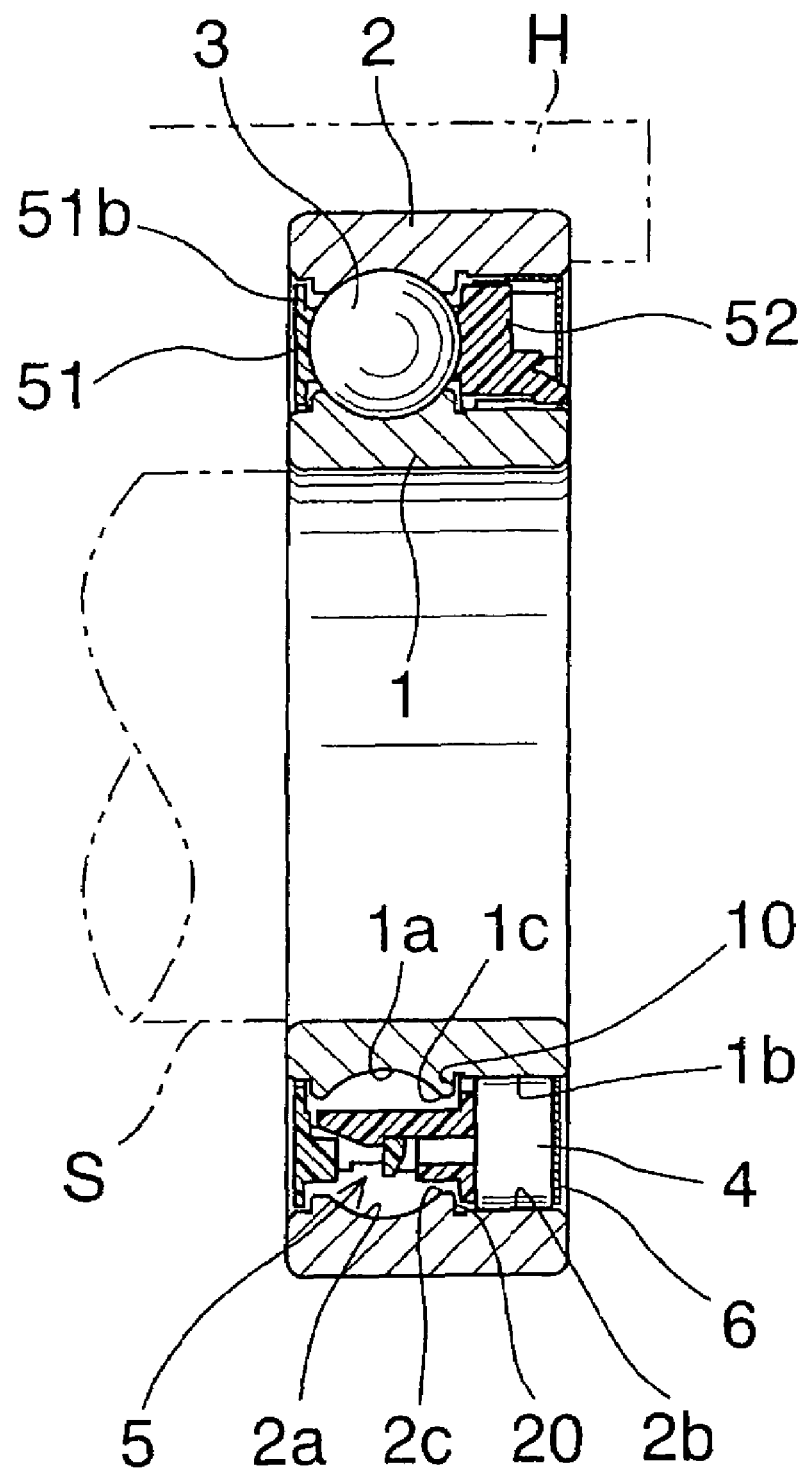
FIG. 7 is a section view taken along the line A-A of FIG. 6.
Figure 8:
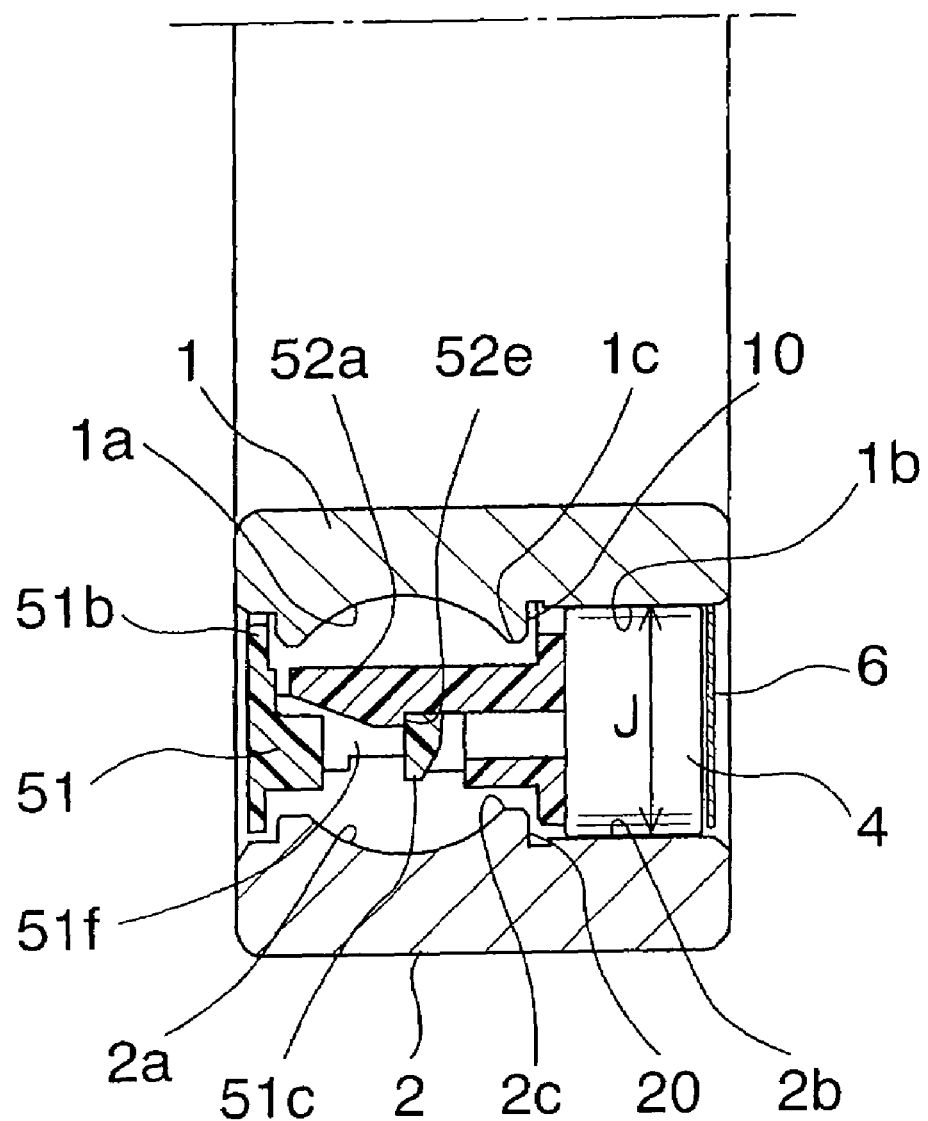
FIG. 8 is a partial enlarged view of FIG. 7.

FIG. 6 is a partially cutaway front view of the embodiment of the invention, FIG. 7 is a section view taken along the line A-A of FIG. 6, and FIG. 8 is a partial enlarged view of FIG. 7.

A raceway surface 1a for a deep groove ball bearing, and a raceway surface 1b for a one-way clutch are formed axially adjacent to each other in the outer peripheral face of an inner race 1. Opposing to the raceway surfaces, a raceway surface 2a for a deep groove ball bearing, and a raceway surface 2b for a one-way clutch are formed on the inner peripheral face of an outer race 2. Plural balls 3 serving as rolling elements are arranged between the inner race 1 and the outer race 2 so as to make rolling contact with both the raceway surfaces 1a and 2a for a deep groove ball bearing, and plural sprags 4 are arranged so as to tiltably make contact with the raceway surfaces 1b and 2b for a one-way clutch.

The balls 3 and the sprags 4 are held at predetermined pitches in the circumferential direction by a common cage 5. The cage 5 has a structure in which the first and second annular members 51 and 52 are engaged and integrated with each other in the axial direction. In the first annular member 51, plural engaging portions 51a are formed at predetermined pitches in the circumferential direction so as to axially protrude. An engaging hole 51b which passes in the axial direction is formed in each of the engaging portions 51a. In the second annular member 52, claws 52a are formed at the same pitches in the circumferential direction so as to axially protrude. An engaging portion 52b is formed in each of the claws 52a. When the engaging portions 52b of the claws 52a of the second annular member 52 are engaged with the engaging holes 51b of the first annular member 51, the first and second annular members 51 and 52 are engaged and integrated in the axial direction with each other, whereby the cage 5 is formed.

An annular flat plate portion 51c is integrally formed on an axial end side of the first annular member 51. The inner and outer peripheries of the plate portion 51c are opposed to the outer peripheral face of the inner race 1, and the inner peripheral face of the outer race 2 via small gaps, respectively. One axial end side of the annular space between the inner race 1 and the outer race 2 is sealed by the flat plate portion 51c.

A spring and side plate 6 is attached to the axial outer side of the second annular member 52. In the spring and side plate 6, as shown in FIG. 6, spring pieces 6b are integrally formed at predetermined pitches in the circumferential direction on a base member 6a formed by an annular flat plate. The base member 6a seals the other axial end side of the annular space between the inner race 1 and the outer race 2, and the spring pieces 6b urge the sprags 4 in a locking direction, respectively.

Between one of the shoulder portions of the raceway surface 1a for a deep groove ball bearing of the inner race 1, i.e., the shoulder 1c on the side of the one-way clutch raceway surface 1b, and the one-way clutch raceway surface 1b, formed is a step 10 that is directed in a direction in which the diameter (outer diameter) of the one-way clutch raceway surface 1b becomes smaller. Between one of the shoulder portions of the raceway surface 2a for a deep groove ball bearing of the outer race 2, i.e., the shoulder 2c on the side of the one-way clutch raceway surface 2b, and the one-way clutch raceway surface 2b, formed is a step 20 that is directed in a direction in which the diameter (inner diameter) of the one-way clutch raceway surface 2b becomes larger.

According to the configuration, the J space (indicated by J in FIG. 8) between the one-way clutch raceway surface 1b of the inner race 1, and the one-way clutch raceway surface 2b of the outer race 2 is wider than that in the conventional art, with the result that the sprags 4 of a larger size can be used.

As indicated by the two-dot chain line in FIG. 7, the embodiment of the invention is used while the inner diameter surface of the inner race 1 is fitted to a shaft S and the outer diameter surface of the outer race 2 is fitted to a housing H. Usually, these fits are realized by an interference fit so as to disable a relative rotation with respect to the fitting counterparts. Since the steps 10 and 20 are formed, the radial thicknesses of the portions of the inner race 1 and the outer race 2 where the one-way clutch raceway surfaces 1b and 2b are formed are reduced. As a result of this thinning, there arises the possibility that the inner race 1 or the outer race 2 follows the shape of the fitting surface of the corresponding counterpart. In the case where the shape accuracy is poor, there is the possibility that also the shape accuracy the one-way clutch raceway surface 1b or 2b is impaired. To comply with this, in the inner race 1 or the outer race 2 which is on the side of one of the counterparts or the shaft S and the housing H that has higher shape accuracy of the fitting surface, the height of the step is increased, whereby the shape accuracy is prevented from exerting an influence. Usually, the shape accuracy of the fitting surface of the shaft S is higher. In this case, therefore, the step 10 of the inner race 1 is set to be larger than the step 20 of the outer race 2, whereby the portion of the inner race 1 where the one-way clutch raceway surface 1b is formed is made thinner, and that of the outer race 2 where the one-way clutch raceway surface 2b is formed is made thicker. According to the configuration, the shape accuracies of both the one-way clutch raceway surfaces 1b and 2b can be kept excellent while ensuring a desired J space.

In the above, the embodiment in which a deep groove ball bearing is used as the rolling bearing has been described. It is a matter of course that a rolling bearing of another kind may be used.

Figure 18:
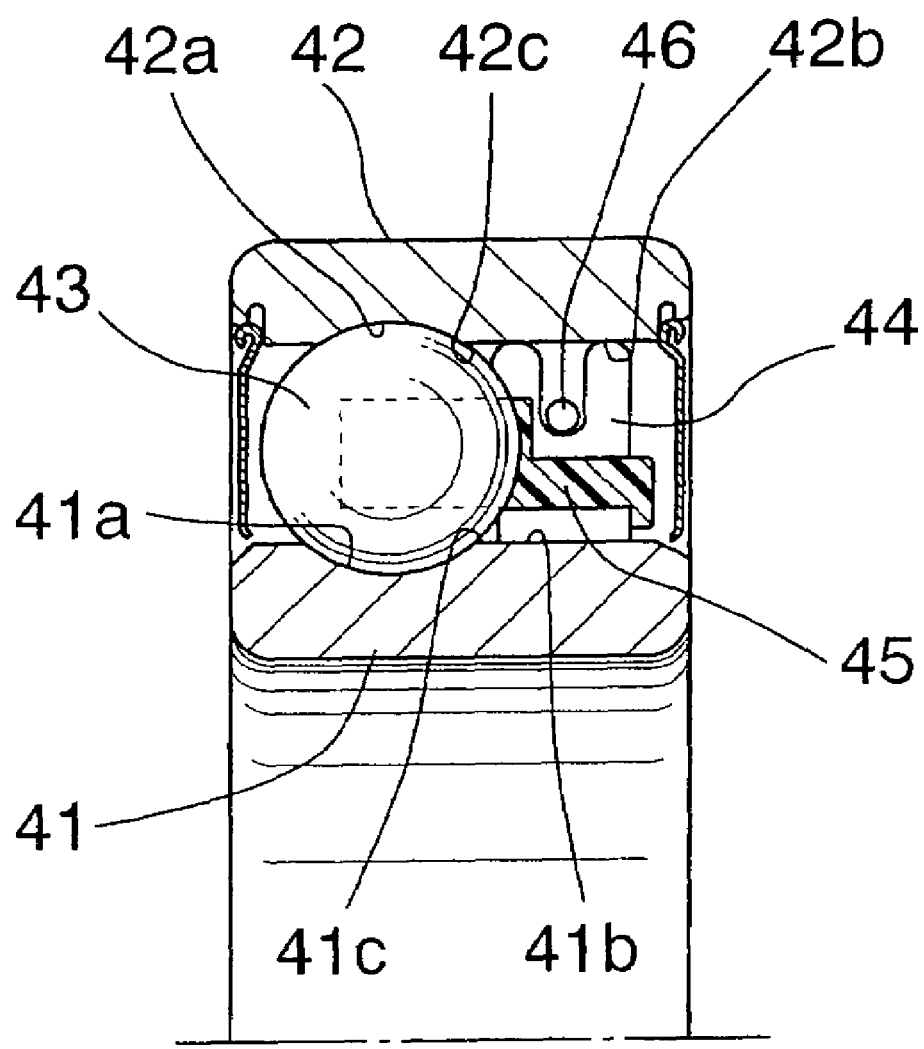
FIG. 18 is an axial section view showing a configuration example of a conventional one-way clutch integrated with a rolling bearing.
Figure 19:
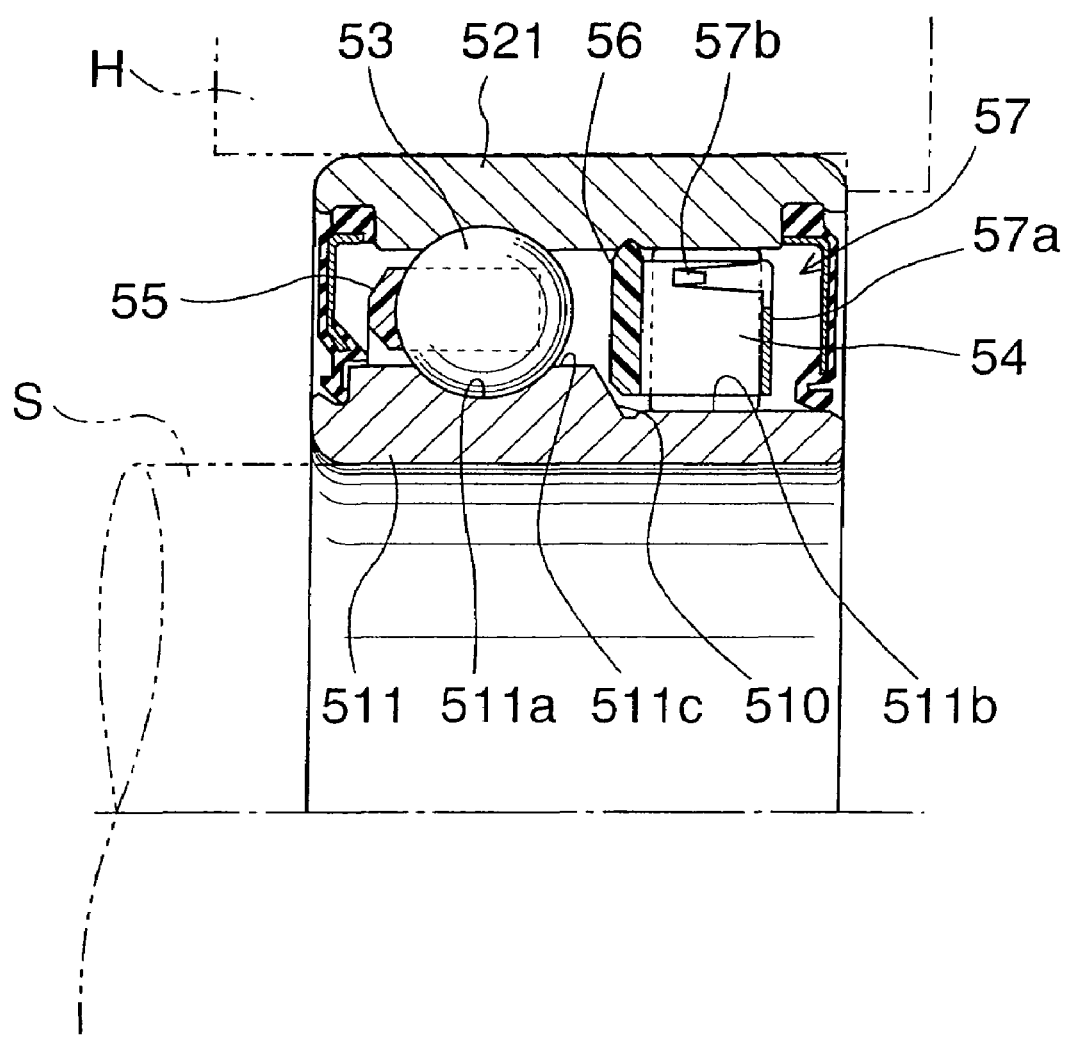
FIG. 19 is an axial section view showing a configuration example of a conventional one-way clutch integrated with a rolling bearing which is improved so as to widen the J space.
Figure 20A:
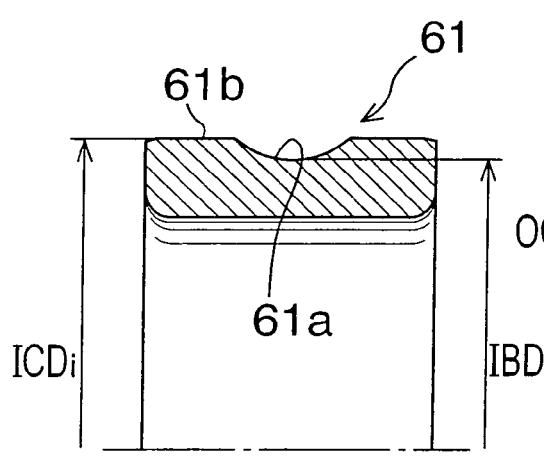
FIG. 20A is a view illustrating a method of controlling the dimensions of a rolling bearing raceway surface and a one-way clutch raceway surface of an inner race of a conventional one-way clutch integrated with a rolling bearing.
Figure 20B:
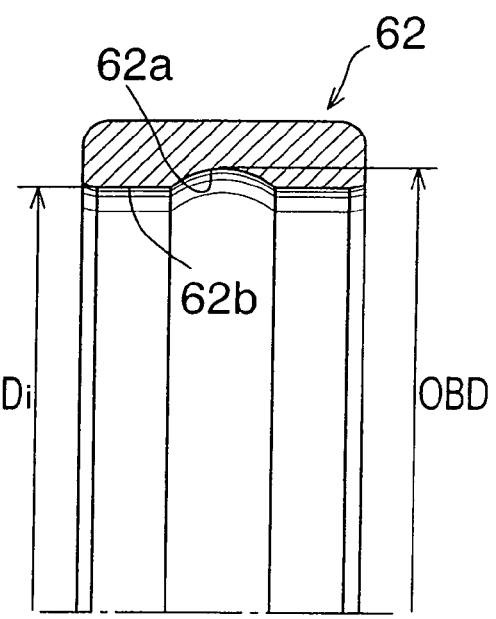
FIG. 20B is a view illustrating a method of controlling the dimensions of an outer race.

In the embodiment described above, the structure in which the two annular members 51 and 52 are engaged and integrated with each other in the axial direction is used as the cage 5. Alternatively, as shown in FIG. 18, a cage for a rolling bearing and that for a one-way clutch may be separately formed, or, as shown in FIG. 19, an integral cage may be used. It is a matter of course that, in place of the spring and side plate used in the embodiment, other known means such as a garter spring shown in FIG. 18 may be used as a spring for urging a sprag of a one-way clutch.

As described above, according to the invention, in each of the inner race and the outer race, the step is formed between the shoulder of the rolling bearing raceway surface and the one-way clutch raceway surface, whereby the J space formed between the one-way clutch raceway surfaces of the inner and outer races can be made wider than the dimension formed by the shoulder of the rolling bearing raceway surface. According to the configuration, larger sprags can be used, and the performance including the transmission torque can be improved without causing the whole size to be increased as compared with a conventional one. In one of the inner and outer races which is on the side of a counterpart having a higher shape accuracy of the fitting surface, the step of the race is made larger, whereby degradation of the shape of the one-way clutch raceway surface which is caused by following to the counterpart due to the thickness reduction can be prevented from occurring.

Next, a third embodiment of the invention will be described with reference to the accompanying drawings.

Figure 9:
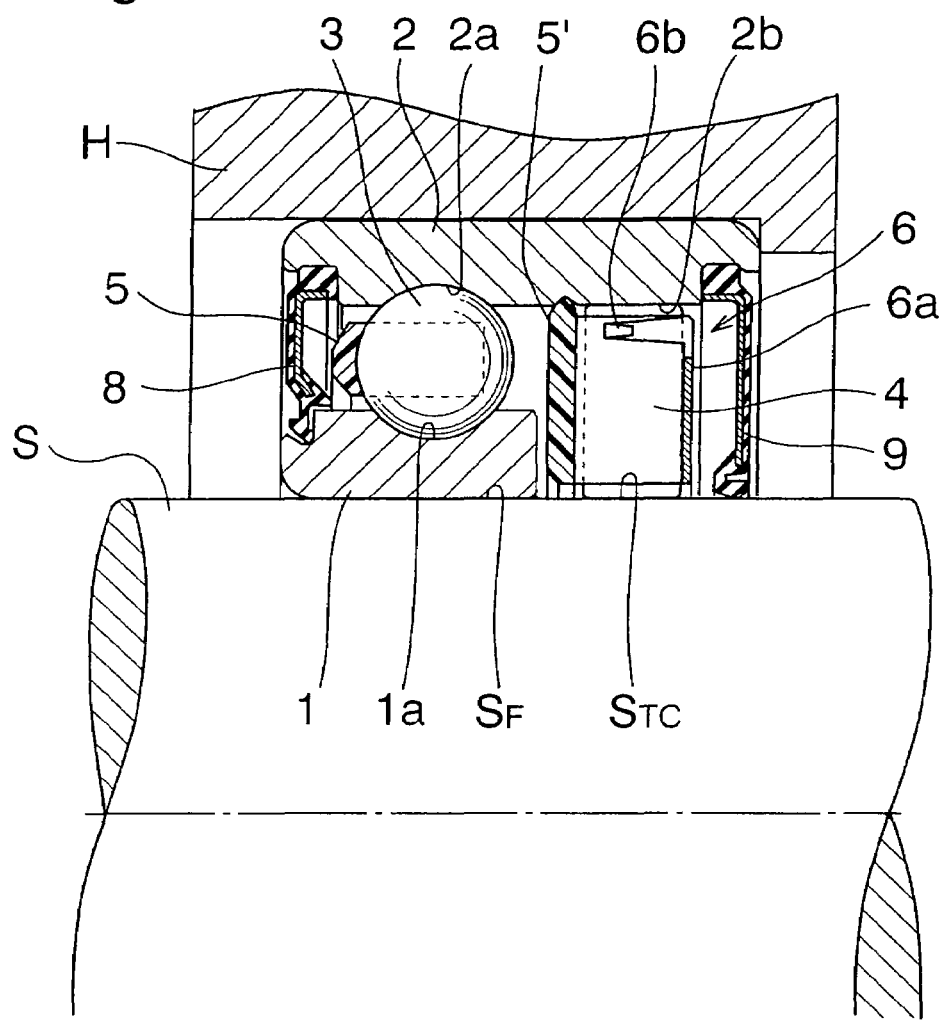
FIG. 9 is an axial section view of a third embodiment of the invention.

FIG. 9 is an axial section view of a third embodiment of the invention, and showing a state where the embodiment is incorporated to a shaft S and a housing H.

A one-way clutch integrated with a rolling bearing of the embodiment comprises: an inner race 1; an outer race 2; plural balls 3 which are rollably arranged between the races; plural sprags 4; a ball cage 5 which holds the balls 3 at constant pitches in the circumferential direction; a sprag cage 6 which holds the sprags 4 at constant pitches in the circumferential direction; a spring member 6 in which plural spring pieces 6b for urging the sprags 4 in a locking direction are integrally formed on an annular base member; and seals 8 and 9 for sealing both the axial ends. The shaft S is fitted to the inner peripheral face of the inner race 1, and the outer peripheral face of the outer race 2 is fitted to the housing H.

The embodiment is characterized in that a rolling bearing raceway surface 2a and a one-way clutch raceway surface 2b are formed on the outer race 2, but only a rolling bearing raceway surface 1a is formed on the inner race 1, and the inner peripheral sides of the sprags 4 are in direct contact with the surface of the shaft S, and also that the width (axial dimension) of the inner race 1 is smaller than that of the outer race 2, and fails to reach positions where the sprags 4 are placed.

In the same manner as a conventional one-way clutch of this kind, the rolling bearing raceway surface 2a on which the balls 3 roll, and the one-way clutch raceway surface 2b which extends adjacent to and in parallel with the rolling bearing raceway surface 2a, and with which the outer peripheral sides of the sprags 4 are in contact are formed on the inner periphery of the outer race 2. By contrast, only the rolling bearing raceway surface 1a on which the balls 3 roll is formed on the outer periphery of the inner race 1, and the width (axial dimension) of the inner race 1 is smaller than that of the outer race 2, and fails to reach the positions where the sprags 4 are placed. In each of the sprags 4, the outer peripheral side is in contact with the one-way clutch raceway surface 2b formed on the outer race 2, and the inner peripheral side is in direct contact with the outer peripheral face of the shaft S, so that the outer peripheral face of the shaft S substantially forms an inner one-way clutch raceway surface $S_{TC}$.

In the shaft S, the outer diameter of the portion SF which is fitted to the inner race 1 is equal to that of the portion with which the inner peripheral sides of the sprags 4 are in contact, i.e., that where the one-way clutch raceway surface $S_{TC}$ is formed.

In the embodiment described above, the J space which is the distance between the raceway surfaces of the inner and peripheral sides in the sprags 4 can be widened by a dimension corresponding to the thickness of the inner race 1 as compared with a conventional case. As a result, the performance such as the transmission torque can be improved. The sprags 4 conduct torque transmission between the outer race 2 and the shaft S. Even when the fitting between the inner race 1 and the shaft S is set to be looser than that in a conventional case, therefore, it is possible to eliminate reduction of the torque transmission due to occurrence of slippage between the two members, and the work of attaching the one-way clutch to the shaft S and the housing H can be further simplified as compared with a conventional case.

Figure 10:
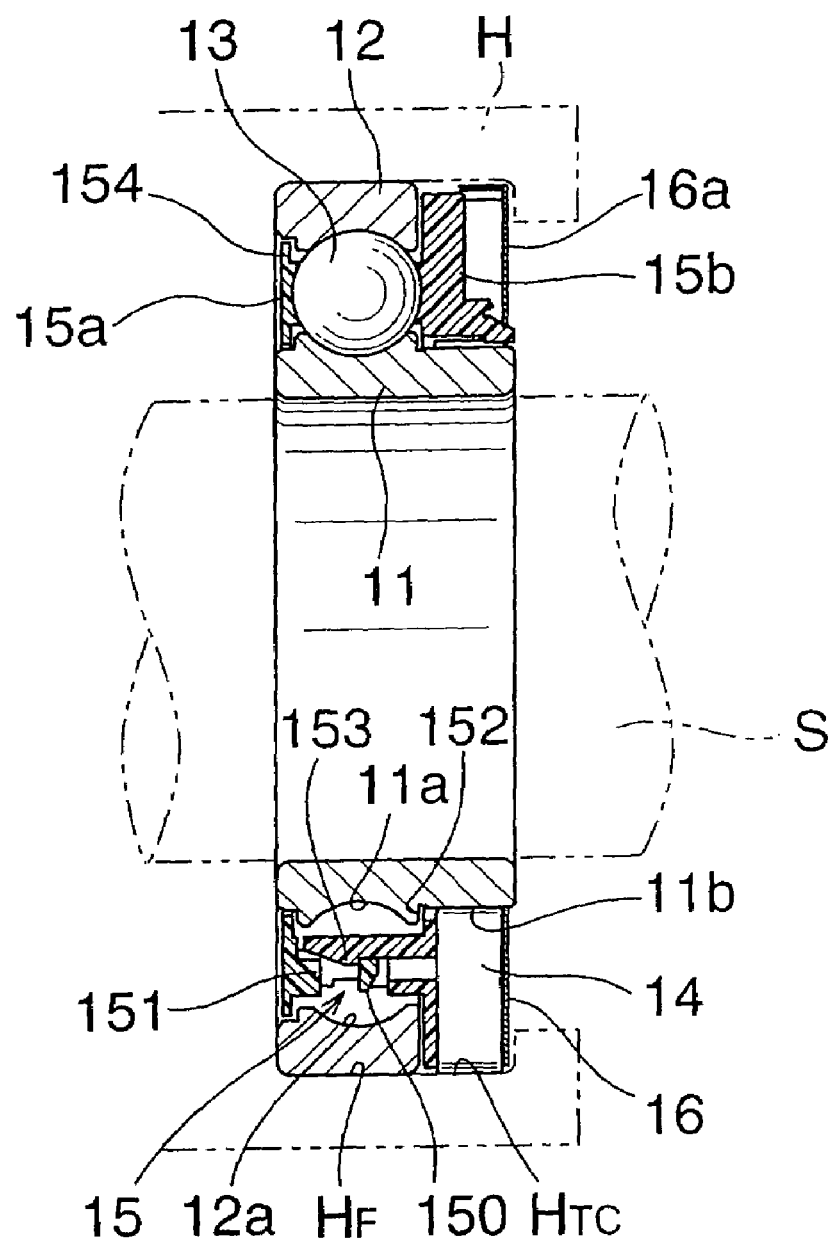
FIG. 10 is an axial section view of another embodiment of the invention.

Next, another embodiment of the invention will be described. FIG. 10 is an axial section view of the embodiment.

The embodiment is characterized in that a rolling bearing raceway surface 11a and a one-way clutch raceway surface 11b are formed on an inner race 11, but only a rolling bearing raceway surface 12a is formed on an outer race 12, and the outer peripheral sides of sprags 14 are in direct contact with the inner peripheral face of the housing H.

The rolling bearing raceway surface 11a on which balls 13 roll, and the one-way clutch raceway surface 11b which extends adjacent to and in parallel with the rolling bearing raceway surface 11a, and with which the inner peripheral sides of the sprags 14 are in contact are formed on the outer periphery of the inner race 11. By contrast, only the rolling bearing raceway surface 12a on which the balls 13 roll is formed on the inner periphery of the outer race 12, and the width of the outer race 12 is smaller than that of the inner race 11, and fails to reach the positions where the sprags 14 are placed. In each of the sprags 14, the inner peripheral side is in contact with the one-way clutch raceway surface 11b formed on the inner race 11, and the outer peripheral side is in direct contact with the inner peripheral face of the housing H, so that the inner peripheral face of the housing H substantially forms an inner one-way clutch raceway surface $H_{TC}$.

In the housing H, the inner diameter of the portion $H_F$ which is fitted to the outer race 12 is equal to that of the portion with which the outer peripheral sides of the sprags 14 are in contact, i.e., that where the one-way clutch raceway surface $H_{TC}$ is formed.

In the embodiment, the balls 13 and the sprags 14 are held by a common cage 15. The cage 15 has a structure in which first and second annular members 15a and 15b are engaged and integrated with each other in the axial direction. In the first annular member 15a, plural engaging portions 150 are formed at constant pitches in the circumferential direction so as to axially protrude. An engaging hole 151 which passes in a radial direction is formed in each of the engaging portions 150. In the second annular member 15b, claws 152 are formed at the same pitches in the circumferential direction so as to axially protrude. An engaging portion 153 is formed in each of the claws 152. When the engaging portions 153 of the claws 152 of the second annular member 15b are engaged with the engaging holes 151 of the first annular member 15a, the first and second annular members 15a and 15b are engaged and integrated in the axial direction with each other, whereby the cage 15 is formed.

In the embodiment, a flat plate portion 154 is integrally formed on one axial end side of the first annular member 15a constituting the cage 15. The flat plate portion 154 functions as a seal for the axial end side. In the same manner as the embodiments described above, a structure in which plural spring pieces (not shown in FIG. 10) are formed integrally on an annular base member 16a is used as a spring member 16 which urges the sprags 14 in the locking direction. The spring member 16 is fixed to the cage 15, and the base member 16a has a function of sealing the other axial end side.

In the embodiment described above, the J space which is the distance between the raceway surfaces of the inner and outer peripheral sides of the sprags 14 can be widened by a dimension corresponding to the thickness of the outer race 12 as compared with a conventional case. As a result, the performance such as the transmission torque can be improved. The sprags 14 conduct torque transmission between the inner race 11 and the housing H. Even when the fitting between the outer race 12 and the housing H is set to be looser than that in a conventional case, therefore, it is possible to eliminate reduction of the torque transmission due to occurrence of slippage between the two members, and the work of attaching the one-way clutch to the shaft S and the housing H can be further simplified as compared with a conventional case.

According to the third embodiment, the one-way clutch raceway surface is integrally formed only on the outer race of the rolling bearing, the outer peripheral sides of the sprags make contact with the one-way clutch raceway surface, and the inner peripheral sides of the sprags are not in contact with the inner race but are in direct contact with the outer peripheral face of the shaft to which the inner race of the rolling bearing is fitted, thereby causing the sprags to transmit a torque between the one-way clutch raceway surface which is formed on the inner periphery of the outer race, and the outer peripheral face of the shaft. Therefore, the J space can be widened and the performance such as the transmission torque can be improved as compared with a conventional case where a rolling bearing raceway surface and a one-way clutch raceway surface are integrally formed on both inner and outer races and sprags transmit a torque between the inner and outer races.

According to another aspect of the invention, the one-way clutch raceway surface is integrally formed only on the inner race of the rolling bearing, the inner peripheral sides of the sprags make contact with the one-way clutch raceway surface, and the outer peripheral sides of the sprags are not in contact with the outer race but are in direct contact with the inner peripheral face of the housing to which the outer race of the rolling bearing is fitted, thereby causing the sprags to transmit a torque between the one-way clutch raceway surface which is formed on the outer periphery of the inner race, and the inner peripheral face of the housing. In the same manner as described above, therefore, the J space can be widened and the performance such as the transmission torque can be improved as compared with a conventional case.

In the inventions described above, the sprags transmit a torque between the outer race and the shaft, or between the inner race and the housing, and hence the race on which only the rolling bearing raceway surface is formed is eliminated from the torque transmission path. Unlike the conventional art, the fitting between the race and the shaft or the housing is not required to be tight. As a result, the race can be fitted more loosely to the shaft or the housing as compared with the conventional art, and the workability of the assembling process is improved.

When a configuration where the outer diameter of a portion of the shaft with which the sprags make contact is equal to the outer diameter of a portion which is fitted to the inner race of the rolling bearing, or that where the inner diameter of a portion of the housing with which the sprags make contact is equal to the inner diameter of a portion to which the outer race of the rolling bearing is fitted is employed, the above-mentioned effects can be attained without affecting the other performances required in the shaft or the housing, and increasing the production cost of the shaft or the housing.

Figure 14:
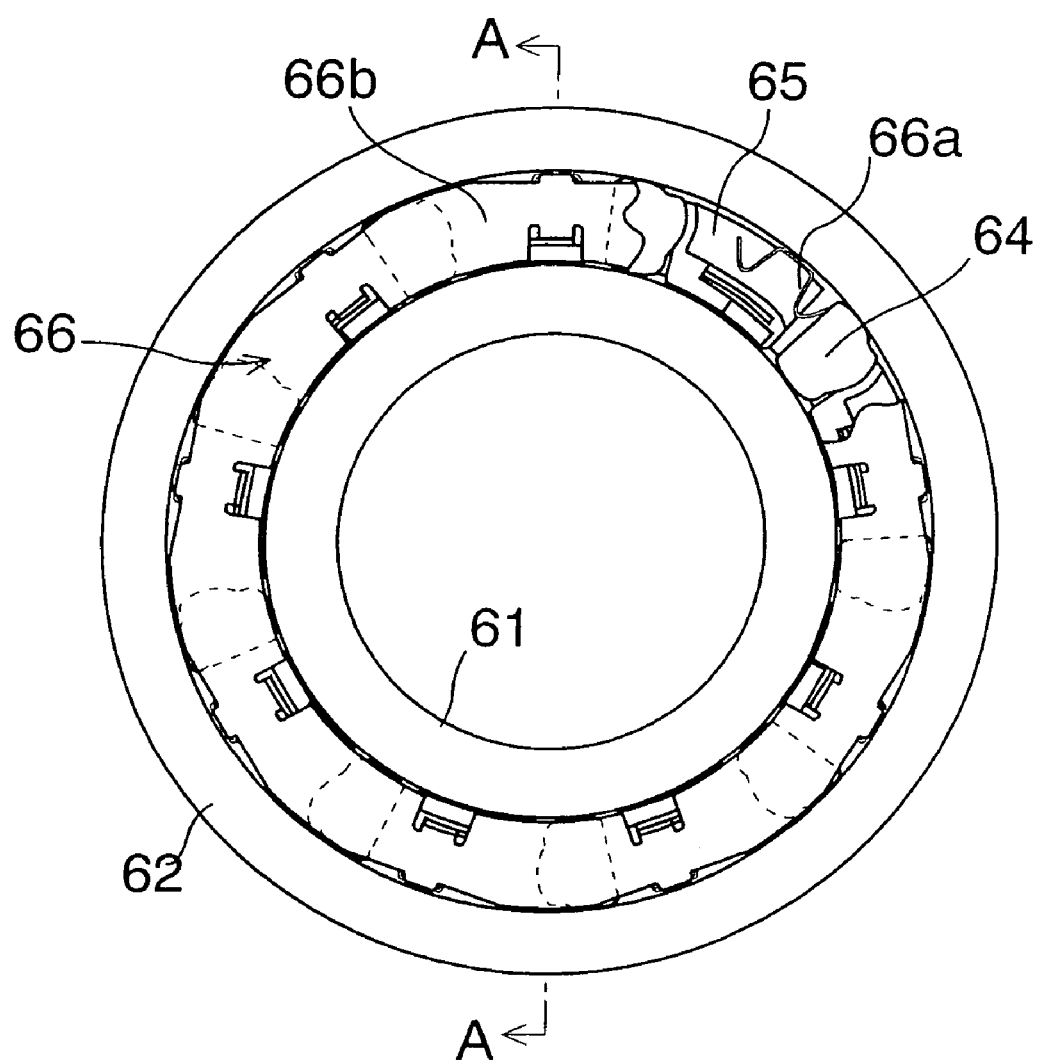
FIG. 14 is a partially cutaway front view showing a configuration example of a conventional one-way clutch integrated with a rolling bearing.
Figure 15:
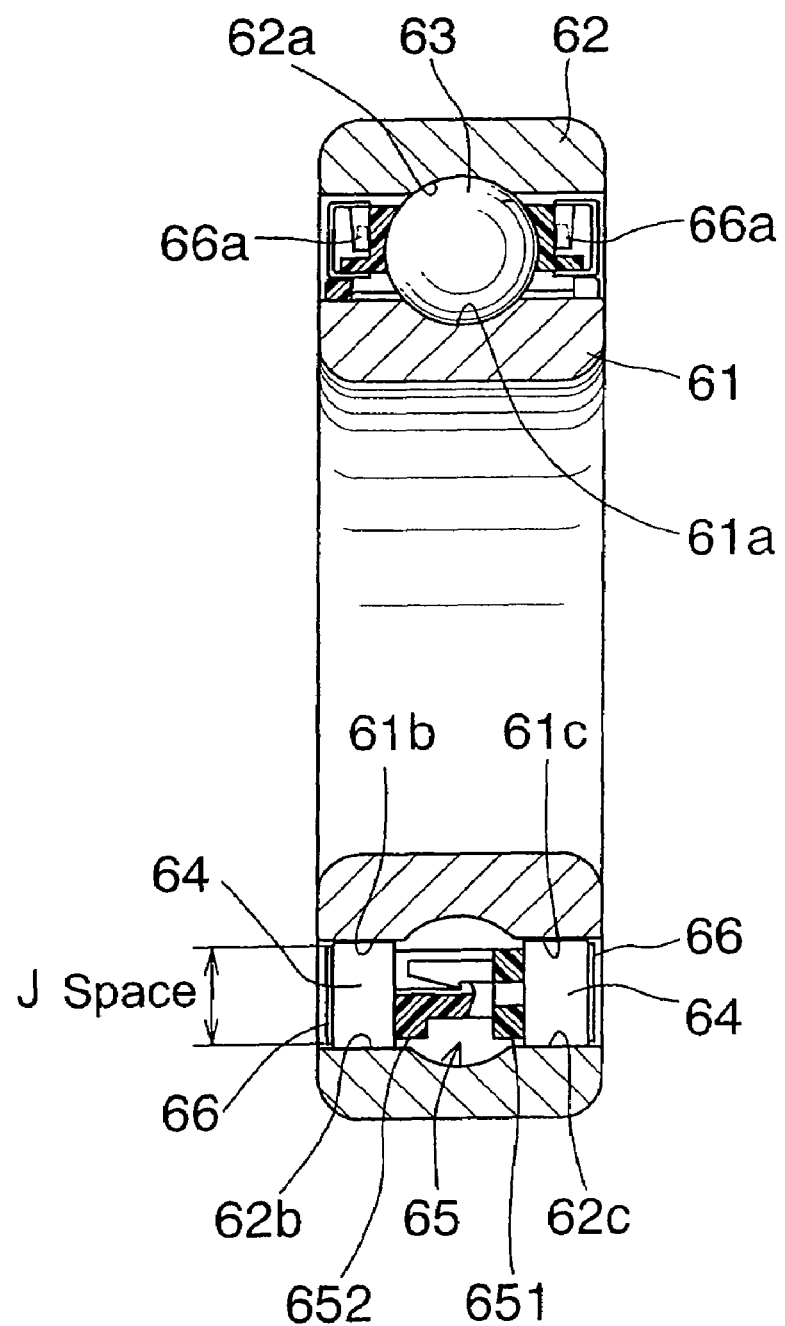
FIG. 15 is an axial section view looking in the direction of A-A in FIG. 14 showing an example of a conventional one-way clutch integrated with a rolling bearing in which a one-way clutch is disposed on each of the sides of a ball bearing.
Figure 16:
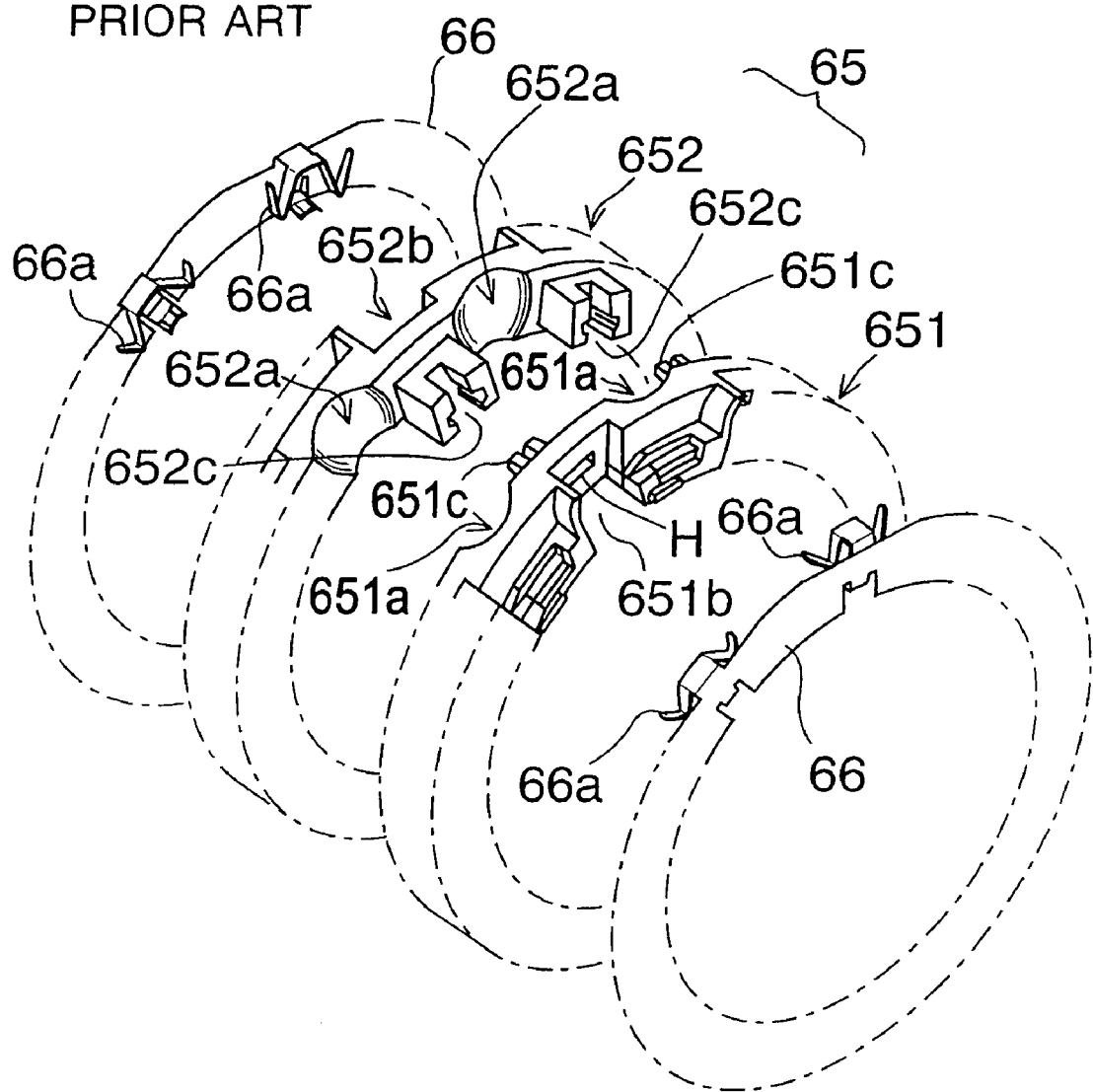
FIG. 16 an exploded perspective view of a cage 65, and spring and side plates 66 in the conventional example of FIG. 15.
Figure 17:
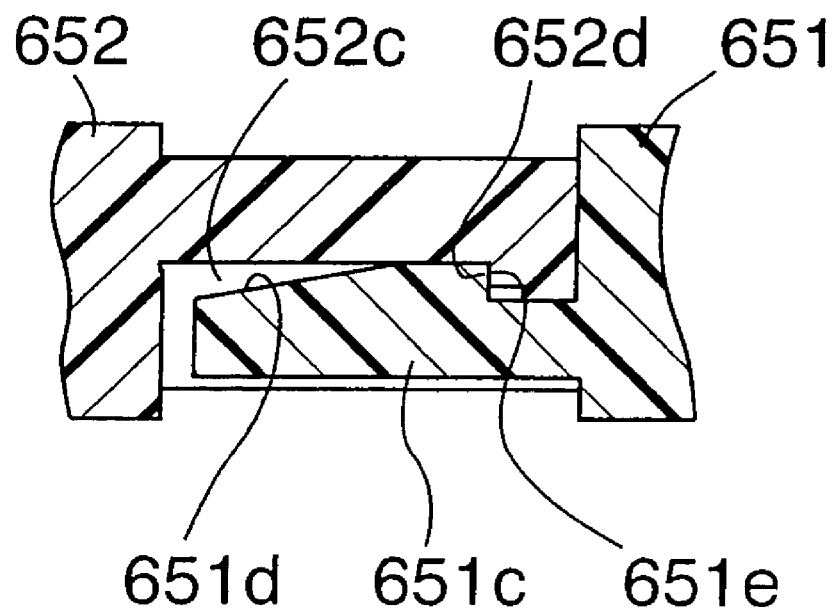
FIG. 17 is a section view of main portions of the conventional example of FIG. 16 in a state where two annular members 651 and 652 constituting the cage 65 are engaged with each other.

Next, a fourth embodiment of the invention will be described with reference to the accompanying drawings. A method of producing a one-way clutch integrated with a rolling bearing having a structure which is identical with that shown in FIGS. 14 and 15 will be described.

FIG. 11 is a view illustrating a method of grinding a rolling bearing raceway surface 1a and a one-way clutch raceway surface 1b of an inner race 1 of the embodiment of the invention, and FIG. 12 is a view illustrating a method of grinding a rolling bearing raceway surface 2a and a one-way clutch raceway surface 2b of an outer race 2 of the embodiment of the invention.

In the inner race 1 and the outer race 2, the rolling bearing raceway surfaces 1a and 2a, and the one-way clutch raceway surfaces 1b and 2b are simultaneously ground by a form grinding process using a grinding wheel 102 or 202 which is shaped by a rotary dresser 101 or 201.

Figure 11A:
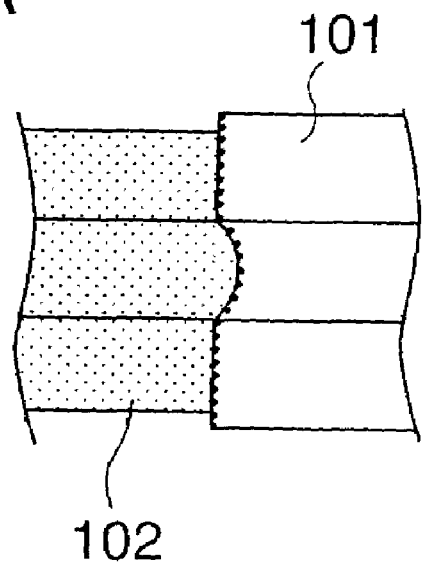
FIG. 11 is a view illustrating a method of grinding an outer peripheral face of an inner race 1 in a fourth embodiment of the invention.
Figure 11B:
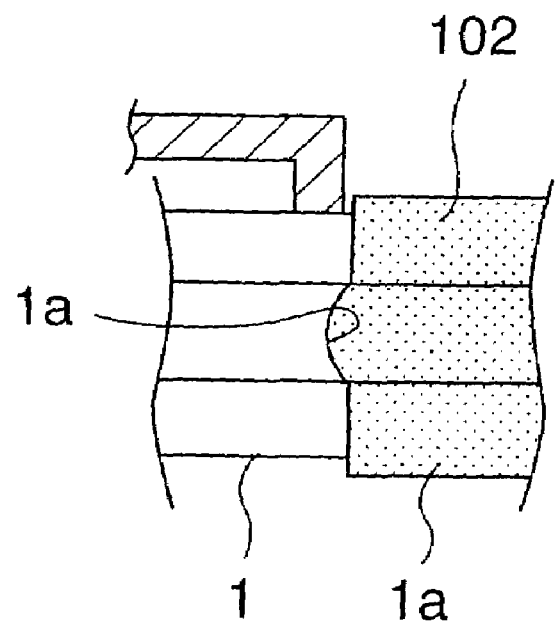
Figure 13A:
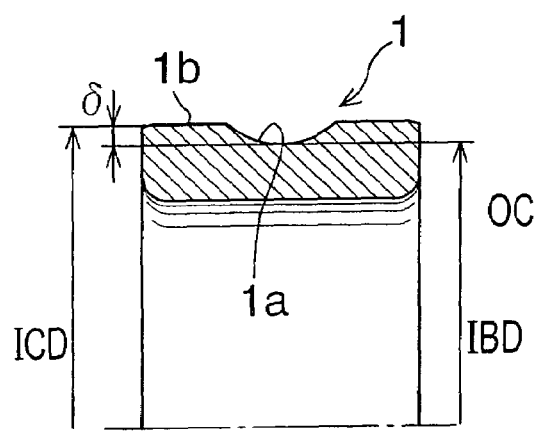
FIG. 13A is a view illustrating relationships between the dimensions of a rolling bearing raceway surface 1a and a one-way clutch raceway surface 1b of the inner race 1 in the fourth embodiment of the invention after grinding.

In a process of grinding the inner race 1, specifically, a known external cylindrical grinding machine such as a microcentric machine is used. As shown in FIG. 11A, toothing and shaping are simultaneously conducted on the grinding wheel 102 by the rotary dresser 101 which is provided with a shape equivalent to the outer peripheral face of the inner race 1 after the grinding process. As a result, the outer peripheral face of the grinding wheel 102 is formed into a negative shape of the outer peripheral face of the inner race 1. When incision is conducted under the state where the grinding wheel 102 is shaped in this way, both the rolling bearing raceway surface 1a and the one-way clutch raceway surface 1b are simultaneously ground in the outer peripheral face of the inner race 1 as shown in FIG. 11B. In the inner race 1 after the grinding process, as shown in FIG. 13A, the difference between the diameter IBD of the rolling bearing raceway surface 1a and the diameter ICD of the one-way clutch raceway surface 1b, or the step indicated by $\delta$ in the figure is always constant.

Figure 12A:
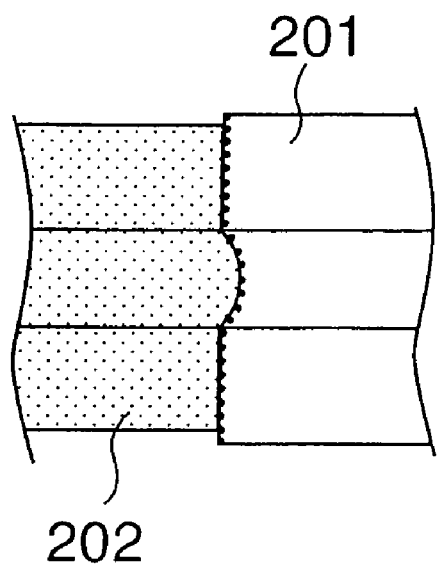
FIG. 12 is a view illustrating a method of grinding an inner peripheral face of an outer race in the fourth embodiment of the invention.
Figure 12B:
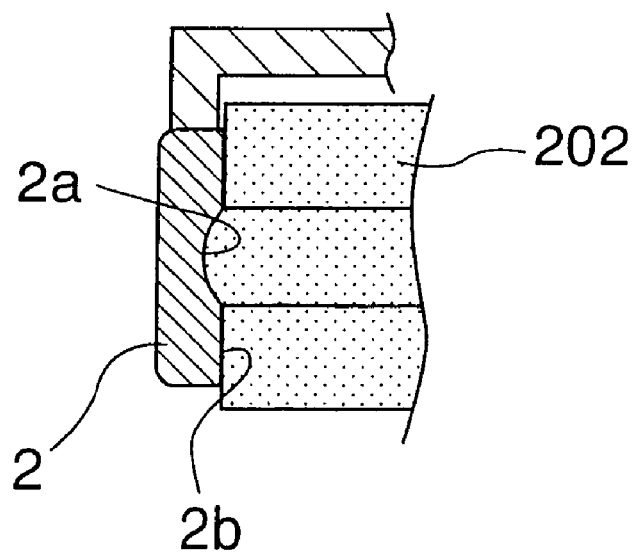
Figure 13B:
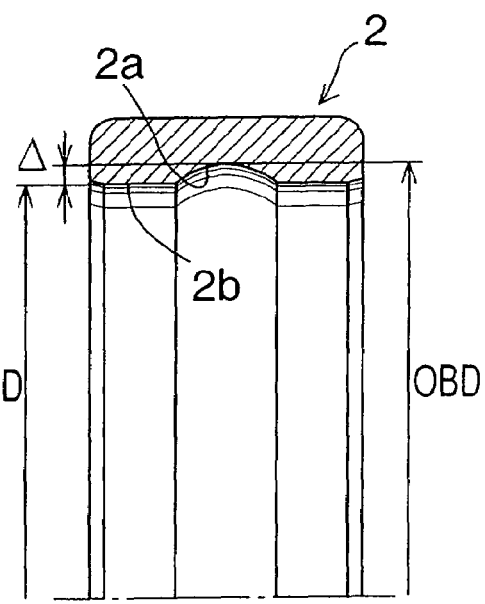
FIG. 13B is a view illustrating relationships between the dimensions of a rolling bearing raceway surface 2a of the outer race 2 and a one-way clutch raceway surface 2b.

In a process of grinding the outer race 2, an internal cylindrical grinding machine is used. In this process also, as shown in FIG. 12A, toothing and shaping are simultaneously conducted on the grinding wheel 202 by the rotary dresser 201 which is provided with a shape equivalent to the inner peripheral face of the outer race 2 after the grinding process. As a result, the outer peripheral face of the grinding wheel 202 is formed into a negative shape of the inner peripheral face of the outer race 2. When incision is conducted under the state where the grinding wheel 202 is shaped in this way, both the rolling bearing raceway surface 2a and the one-way clutch raceway surface 2b are simultaneously ground in the inner peripheral face of the outer race 2 as shown in FIG. 12B. In the outer race 2 after the grinding process, as shown in FIG. 13B, the difference between the diameter OBD of the rolling bearing raceway surface 2a and the diameter OCD of the one-way clutch raceway surface 2b, or the step indicated by $\Delta$ in the figure is always constant.

In the inner race 1 and the outer race 2 which have been subjected to a grinding process with using a rotary dresser as described above, the rolling bearing raceway surfaces 1a and 2a are superfinished. Thereafter, the inner and outer races are subjected to an assembling process. In the assembling process, in order to obtain a desired radial gap Tr after deformation due to the dimensions of counterparts to which the inner race 1 and the outer race 2 are to be fitted, the rolling bearing raceway surfaces 1a and 2a of the inner race 1 and the outer race 2 are measured, and a combination that enables an initial radial gap in which the deformation is considered is selected.

In the one-way clutch integrated with a rolling bearing which is assembled by the method, the J space of the one-way clutch after the inner race 1 and the outer race 2 are incorporated into the counterparts is given by expression (1) above, and always substantially constant because $(\delta+\Delta)$ is constant.

According to the production method, in the inner race 1 and the outer race 2, therefore, it is substantially unnecessary to inspect and control the dimensions of the one-way clutch raceway surfaces 1b and 2b, and it is requested only to control the dimensions of the rolling bearing raceway surfaces 1a and 2a. Even when only matching required in a rolling bearing is conducted, not only the radial gap of the rolling bearing but also the J space has a designed value.

In the above embodiments, a one-way clutch integrated with a rolling bearing in which a one-way clutch is disposed on one axial side of a rolling bearing has been described. It is a matter of course that the invention can be similarly applied also to a structure in which a one-way clutch is disposed on each of the axial sides of a rolling bearing.

As described above, according to the invention, with respect to both inner and outer races, it is not required to produce one-way clutch raceway surfaces which have plural different kinds of dimensions in accordance with counterparts. Therefore, the number of steps of inspecting and controlling the dimensions of the one-way clutch raceway surface can be reduced, and the production cost can be lowered.

What is claimed is:

1. An integrated one-way clutch and rolling bearing, comprising:
   an inner race and an outer race of said rolling bearing;
   balls which are rollably arranged between the inner and outer races;
   said one-way clutch including sprags;
   an outer peripheral face of a shaft being fitted to an inner peripheral face of said inner race of said rolling bearing; and
   a one-way clutch raceway surface with which outer peripheral sides of the sprags of said one-way clutch make contact being integrally formed on an axial side of a raceway surface of an outer race of said rolling bearing, and inner peripheral sides of said sprags making contact with an outer peripheral face of said shaft, thereby conducting torque transmission between said outer peripheral face of said shaft and said one-way clutch raceway surface of said outer race.

2. The integrated one-way clutch and rolling bearing according to claim 1, wherein an outer diameter of a portion of said shaft with which the inner peripheral sides of said sprags make contact is approximately equal to an outer diameter of a portion to which said inner peripheral face of said inner race of said rolling bearing is fitted.

3. An integrated one-way clutch and rolling bearing, comprising:
   an inner race and an outer race of said rolling bearing;
   balls which are rollably arranged between the inner and outer races;
   said one-way clutch including sprags;
   a housing to which an outer peripheral face of an outer race of said rolling bearing is fitted; and
   a one-way clutch raceway surface with which inner peripheral sides of the sprags of said one-way clutch make contact being integrally formed on an axial side of a raceway surface of an inner race of said rolling bearing, and outer peripheral sides of said sprags making contact with an inner peripheral face of said housing, thereby conducting torque transmission between said inner peripheral face of said housing and said one-way clutch raceway surface of said inner race.

4. The integrated one-way clutch and rolling bearing according to claim 3, wherein an inner diameter of a portion of said housing with which the outer peripheral sides of said sprags make contact is approximately equal to an inner diameter of a portion to which said outer peripheral face of said outer race of said rolling bearing is fitted.

* * * * *